(12) United States Patent
Brogan et al.

(10) Patent No.: US 9,973,125 B2
(45) Date of Patent: May 15, 2018

(54) OPERATING A WIND TURBINE BEING CONNECTED TO A UTILITY GRID SOLELY VIA AN UMBILICAL AC CABLE WITH A NETWORK BRIDGE CONTROLLER PERFORMING A POWER AND A VOLTAGE CONTROL

(71) Applicant: SIEMENS AKTIENGESELLSCHAFT, München (DE)

(72) Inventors: Paul Brian Brogan, Glasgow (GB); Nikolaus Goldenbaum, Ry (DK); Jacqueline Wilkie, Glasgow (GB); Rainer Zurowski, Forchheim (DE)

(73) Assignee: SIEMENS AKTIENGESELLSCHAFT (DE)

( * ) Notice: Subject to any disclaimer, the term of this patent is extended or adjusted under 35 U.S.C. 154(b) by 98 days.

(21) Appl. No.: 15/175,069

(22) Filed: Jun. 7, 2016

(65) Prior Publication Data
US 2017/0009744 A1    Jan. 12, 2017

(30) Foreign Application Priority Data
Jul. 7, 2015  (EP) .................................. 15175605

(51) Int. Cl.
*H02J 3/36* (2006.01)
*H02P 21/00* (2016.01)
(Continued)

(52) U.S. Cl.
CPC ............... *H02P 21/50* (2016.02); *F03D 7/00* (2013.01); *F03D 7/0284* (2013.01); *F03D 9/257* (2017.02);
(Continued)

(58) Field of Classification Search
CPC ..... Y02E 10/763; Y02E 60/60; Y02E 10/723; H02J 3/36; H02J 3/386; H02J 3/40;
(Continued)

(56) References Cited

U.S. PATENT DOCUMENTS

2007/0108771 A1   5/2007 Jones
2011/0313591 A1   12/2011 Andresen
(Continued)

FOREIGN PATENT DOCUMENTS

EP    2065901 A2    6/2009
EP    2429073 A2    3/2012
(Continued)

OTHER PUBLICATIONS

Japanese Office Action dated May 29, 2017; JP Pat. Appl. No. 2016-135225; 3 pgs.
(Continued)

*Primary Examiner* — Robert Deberadinis
(74) *Attorney, Agent, or Firm* — Schmeiser Olsen & Watts LLP

(57) ABSTRACT

A method for controlling the operation of a wind turbine is provided. The method includes receiving, by means of a power controller, an active power reference signal and an active power feedback signal; determining, by means of the power controller and based on the active power reference signal and the active power feedback signal, a first voltage control signal and a power controller frequency signal; determining, by means of a frequency droop gain unit and based on the power controller frequency signal, a second voltage control signal; determining, by means of a theta integrator unit and based on the power controller frequency signal, an actual angle signal being indicative for an actual angle between a rotating dq reference frame and a stationary abc reference frame; and controlling operation of a network
(Continued)

bridge based on the first voltage control signal, the second voltage control signal, and the actual angle signal.

15 Claims, 8 Drawing Sheets

(51) Int. Cl.
    *F03D 7/02*     (2006.01)
    *G05F 1/12*     (2006.01)
    *G05F 1/455*     (2006.01)
    *H02J 3/38*     (2006.01)
    *F03D 7/00*     (2006.01)
    *H02P 9/48*     (2006.01)
    *F03D 9/25*     (2016.01)
    *H02J 3/40*     (2006.01)

(52) U.S. Cl.
    CPC ............... *G05F 1/12* (2013.01); *G05F 1/455* (2013.01); *H02J 3/36* (2013.01); *H02J 3/386* (2013.01); *H02P 9/48* (2013.01); *F05B 2270/335* (2013.01); *F05B 2270/337* (2013.01); *H02J 3/40* (2013.01); *Y02E 10/723* (2013.01); *Y02E 10/763* (2013.01); *Y02E 60/60* (2013.01)

(58) Field of Classification Search
    CPC .......... H02P 21/50; F03D 7/0284; F03D 7/00; G05F 1/12; G05F 1/455
    See application file for complete search history.

(56) References Cited

U.S. PATENT DOCUMENTS

2014/0103654 A1     4/2014   Kosaka
2015/0022007 A1     1/2015   Clark et al.

FOREIGN PATENT DOCUMENTS

| EP | 2713477 A1 | 4/2014 |
| JP | 2009516488 A | 4/2009 |
| JP | 2012005346 A | 1/2012 |
| JP | 2014082861 A | 5/2014 |
| WO | WO 2013026583 A1 | 2/2013 |
| WO | WO 2015024583 A1 | 2/2015 |

OTHER PUBLICATIONS

European Extended Search Report dated Dec. 21, 2015, Application No. 15175605.3-1804; 11 pgs.

OPERATING A WIND TURBINE BEING CONNECTED TO A UTILITY GRID SOLELY VIA AN UMBILICAL AC CABLE WITH A NETWORK BRIDGE CONTROLLER PERFORMING A POWER AND A VOLTAGE CONTROL

CROSS-REFERENCE TO RELATED APPLICATION

This application claims priority to European Application No. 15175605.3 having a filing date of Jul. 7, 2015 the entire contents of which are hereby incorporated by reference.

FIELD OF TECHNOLOGY

The following generally relates to the technical field of transmitting electrical power, which has been generated by a wind park comprising a plurality of wind turbines, from the wind park to a power grid. Specifically, the present invention relates to a control method for controlling the operation of a wind turbine of a wind park which is connectable to a utility grid (selectively via a HVDC power transmission system and/or via an AC auxiliary power transmission system), wherein the wind park is connected to the utility grid solely via the AC auxiliary power transmission system. Further, the present invention relates to a network bridge controller, to a wind turbine and to a power generating and forwarding system which are all capable of carrying out the described control method. Furthermore, the present invention relates to a computer program for controlling the operation of a wind turbine in accordance with the described control method.

BACKGROUND

Wind turbines are used to convert mechanical wind energy to electrical energy in a clean and efficient way. In a wind turbine a mechanical drive train comprising a rotor with several rotor blades drives an electric generator, either directly or by means of a gearbox. The resulting alternating current (AC) frequency that is developed at stator terminals of the electric generator is directly proportional to the speed of rotation of the rotor. The voltage at the stator terminals also varies as a function of the rotational speed and the reactive power requirements of the generator. For an optimum energy capture, this rotational speed varies according to the speed of the available wind driving the rotor blades. To limit the energy capture at high wind speeds and to avoid a potential damage of the rotor, the rotational speed of the generator may be controlled by altering the pitch angles of the rotor blades.

An adaptation of the variable voltage and frequency of the electric generator to a nominally fixed voltage and frequency of a power grid is typically achieved by a power converter. A power converter typically includes a generator bridge, which in normal operation operates as an active rectifier to supply power to a direct current (DC) link. The generator bridge can have any suitable topology with a series of semiconductor power switching devices fully controlled and regulated using a pulse width modulation (PWM) strategy. A power converter typically further comprises a network bridge which converts the DC power of the DC link to an AC power output, which in voltage, frequency, and phase angle is matched to the respective electric quantities of the power grid. When transferring or shipping power from the network bridge or from a bus bar being connected to a plurality of network bridges (e.g. via respectively one transformer), apart from the amplitude also the relative phase of the voltage signal at the output of the network bridge or at the bus bar with respect to the phase of the power grid is an important quantity for the amount of power which can be transferred.

In this respect it is mentioned that this phase angle is associated with a certain back Electro Motive Force (back EMF), which in another approach for explaining an electric power transfer is necessary for shipping electric power to the power grid. In this approach the back EMF is generated by the power grid.

By contrast to an AC power connection it is however also possible to transfer the electric power being generated in particular by a plurality of wind turbines being assigned to a wind park to a power or utility grid via a so called High Voltage Direct Current (HVDC) power connection. Such a solution may be in particular appropriate for an offshore wind park or an so called islanded wind park, where the distance between (a) a common bus bar, often also called Point of Common Coupling (PCC), of the wind park, and (b) the respective power receiving (onshore) power grid is large (e.g. hundreds of kilometers). With long distances the electric power losses within an HVDC power transmission system are much smaller than the corresponding losses within an AC power transmission system, in which the inductive power losses caused in particular by the parasitic inductance of the respective cable are much larger.

In the following a power transmission from an offshore wind park via a HVDC power transmission system to an onshore power grid is described:

(1) Each one of a plurality of offshore wind turbines comprises (a) a three phase power converter with a generator (AC-DC) bridge, a DC link, and a three phase network (DC-AC) bridge, and (b) an interface to a medium voltage AC system via a power transformer. Each wind turbine exports AC electrical power from the network bridge into the medium voltage AC power collector system by ensuring that the network bridge modulated voltage has a correct phase angle and magnitude with respect to the medium voltage AC power collector system.

(2) The medium voltage AC power collector system is connected to a high voltage (HV) AC power collector system via a transformer being erected offshore at a substation platform.

(3) The HVAC power output and other HVDC power outputs from other substation platforms are collected at a second bus bar and fed, as a common HVAC power output, to a HVDC platform wherein the common HVAC power output is converted to a DC power output.

(4) The DC power output is transmitted onshore via a (low loss) HVDC cable which may have a length of some more than 100 km.

(5) Onshore the DC power output is fed to a (DC-AC) converter station which generates a modulated AC voltage output. This modulated AC voltage output is controlled with an appropriate voltage and frequency respectively phase angle into the onshore AC power grid so as to export the required power into the onshore AC power grid.

For converting the common HVAC power output into the DC power output at the HVDC platform (see item (3) above), a high power AC-DC converter may be used, which comprises altogether six power semiconductor switches, wherein respectively two power semiconductor switches are connected in series within one (out of three) half bridge paths each extending between the two DC output terminals of the high power AC-DC converter. The power semiconductor switches may be driven in a known manner by means of a Pulse Width Modulation (PWM). Such an AC-DC conversion has the advantage that by providing appropriate switching patterns a bi-directional power flow is possible. However, disadvantages of such an AC-DC conversion are that the high power AC-DC converter is a complex, large and extremely heavy entity. For a reliable operation an air insulation must be provided.

Recently there has been proposed another approach for a AC-DC power conversion at the HVDC platform, which approach is based on the concept of the offshore end of the HVDC system comprising a rectifier having six passive high power diodes. Again, respectively two high power diodes are connected in series within one (out of three) half bridge paths each extending between the two DC output terminals of the corresponding power rectifier. This approach has the advantage that the rectifier can be realized as an encapsulated device and in a simple and robust manner. Power losses within the rectifier are small and the operation of the rectifier does only require comparatively low maintenance costs.

However, a disadvantage of the "rectifier approach" may be that only a one way power flow is possible. In case power has to be transferred from the onshore power grid to the wind park a corresponding HVDC power transmission system must be equipped with a so called umbilical AC cable extending between the onshore power grid and the wind park parallel with respect to the HVDC power cable. A power transfer via the umbilical AC cable may be necessary e.g. during a start-up phase of at least some wind turbines of the wind park when the power generation of the other wind turbines is not sufficient in order to allow for a reliable start-up.

A further challenge when using a (passive) rectifier is that the amplitude, the frequency, and the phase of the offshore HVAC power output which is supposed to be rectified must be controlled exclusively by the DC-AC network bridges of each individual wind turbine.

When operating a wind park several operational modes (OM) may be used, which all required a careful wind turbine control in order to allow for a high operational control. Specifically, in a first operational mode (OM1) the wind park is connected to the utility grid solely via the AC auxiliary power transmission system. In a second operational mode (OM2) the wind park is connected to the AC power grid only via the HVDC power transmission system. In a third operational mode (OM3) the wind park is connected to the AC power grid via both the HVDC power transmission system and umbilical power transmission system.

SUMMARY

An aspect relates to a control procedure for a wind turbine which is comprised by a wind park, wherein the wind park is connected to the utility grid solely via the AC auxiliary power transmission system.

According to a first aspect of the invention there is provided a method for controlling the operation of a wind turbine, wherein the wind turbine comprises (i) a mechanical drive train, (ii) an electric generator being mechanically connected to the drive train, and (iii) a power converter being electrically connected to the generator, wherein the wind turbine forms a part of a wind park which is connectable to a utility grid (i) via a HVDC power transmission system and/or (ii) via an AC auxiliary power transmission system, and wherein the wind park is in a first operational mode (OM1) in which the wind park is connected to the utility grid solely via the AC auxiliary power transmission system. The provided method comprises (a) receiving, by means of a power controller, an active power reference signal being indicative for the active power which is supposed to be generated by the wind turbine and an active power feedback signal being indicative for the active power which is actually generated by the wind turbine; (b) determining, by means of the power controller and based on the active power reference signal and on the active power feedback signal, a first voltage control signal and a power controller frequency signal; (c) determining, by means of a frequency droop gain unit and based on the power controller frequency signal, a second voltage control signal; (d) determining, by means of a theta integrator unit and based on the power controller frequency signal, an actual angle signal being indicative for an actual angle between a rotating dq reference frame and a stationary abc reference frame; and (e) controlling the operation of a network bridge of the power converter based on the first voltage control signal, the second voltage control signal, and the actual angle signal.

The provided control method is based on the idea that by determining the described control signals, i.e. the first voltage control signal, the second voltage control signal, and the actual angle signal, a comprehensive control of a whole power generating and forwarding system comprising a wind park with a plurality of wind turbines including the described wind turbine, an AC system with which the AC power being produced by the plurality of wind turbines is collected, the HVDC power transmission system, and the AC auxiliary power transmission system can be realized. Thereby, in a beneficial manner, the described wind turbine (and also the other wind turbines of the wind park) can operate in an autonomous manner, i.e. without relying on any communicational interaction with adjacent wind turbines.

Specifically, with the described control method it may be possible to coordinate the power production of a whole wind park automatically in a coordinated manner without requiring or reverting to a coordination by means of a superordinate wind park controller which is often called a High Performance Park Pilot (HPPP) controller and which only allows for a comparatively slow control. Specifically, a coordinated control of the whole wind park can be effectively realized without the need of any exchange of control information between the individual wind turbines. In this concept each wind turbine acts as an individual entity but in a responsible manner with respect to the aim of achieving at least partially a power balance which is indicated by a stabilized frequency of the AC system.

Descriptive speaking, the wind turbine may autonomously control its own active power output under normal conditions as it would be in a conventional wind turbine control procedure. In accordance with an embodiment of the invention the wind turbine can then, based on local measurements and/or derivations, make an autonomous decision to react in a certain way which is coordinated with the remainder wind turbines of a wind park, which are also making autonomous decisions.

An important technical characteristic of the described control method may be that there is no frequency controller active respectively being used in order to determine the first voltage control signal, the second voltage control signal, and the actual angle signal.

The active power feedback signal may be determined based on current feedback signals and voltage feedback signals which are indicative for the actual current respectively the actual voltage at the output of the network bridge.

The active power reference signal may be provided, if applicable under consideration of a request given by a central wind park controller (e.g. a HPPP), by a wind turbine controller.

With the described control method several technical issues (TI) can realized, which are all related to the above defined first operational mode (OM1) in which the wind park is connected to the utility grid solely via the AC auxiliary power transmission system.

TI1: The power flow within any individual wind turbine can be controlled in order to satisfy the local wind turbine power demand.

TI2: The aggregated AC voltage collected at the AC system from the multiple autonomous wind turbines can be controlled.

TI3: The power flow via the umbilical power transmission system can be controlled.

In this document the term "wind park" may be any arrangement comprising at least two wind turbines which generate electric power which is commonly provided to a utility grid. A "wind park" may also be denoted a "wind farm" or even more descriptive a "wind power plant". The wind park can be located offshore or onshore.

It is mentioned that in this document the AC auxiliary power transmission system is also referred to as a umbilical power transmission system. Further, the utility grid may also referred to as a power grid.

Further, in accordance with known control strategies, the control signals Vd and Vq are signals in the rotating dq reference frame. Furthermore, also in accordance with known control strategies, the first voltage control signal, the second voltage control signal, and the actual angle signal are not directly fed into the network bridge. These signals are provided in a known manner to a pulse width modulation (PWM) generator, which is driving power switching elements of the network bridge.

With regard to the structural design of the power converter it is mentioned that in a known manner the power converter comprises, in addition to the network bridge, a DC link and a generator bridge. Thereby, the generator bridge is connected between the electric generator and the DC link and the network bridge is connected between the DC link and a wind turbine transformer.

In the context of this document the term mechanical drive train is used for all mechanical components of the wind turbine which are provided for mechanically driving a rotor of the generator. Specifically, the drive train may include a wind rotor having preferably three rotor blades being mounted at a hub, a rotatable drive shaft connecting the hub with the rotor of the generator either in a direct manner or in an indirect manner via e.g. gear box.

According to an embodiment of the invention the method further comprises (a) receiving, by means of a voltage controller, a reference voltage signal being indicative for an AC voltage which is supposed to be provided by the network bridge and a magnitude of a feedback voltage being indicative for the AC voltage which is actually provided by the network bridge; and (b) determining, by means of the voltage controller and based on the magnitude and on the reference voltage signal, a voltage controller signal. Thereby, the second voltage control signal is further determined based on the voltage controller signal.

Taking into account the described voltage controller signal may provide the advantage that the voltage control signal provided to the PWM generator is at least partially also influenced by the generated voltage such that the described control method allows for controlling the operation of the network bridge in a highly reliable manner, wherein the above mentioned TI1, TI2, and TI3 can be realized even more precisely.

According to a further embodiment of the invention the reference voltage signal comprises two components, a first component and a second component. Thereby, the first component is provided by a wind turbine controller and the second component is derived from the power controller frequency signal, and the second component is provided by the frequency droop gain unit.

Descriptive speaking, according to the embodiment described here the operation of the voltage controller depends partially on the operation of the power controller. Specifically, the operation of the voltage controller depends on the power controller frequency signal.

Preferably, the reference voltage signal for the voltage controller may be given simply by the sum of the two components. This may provide the advantage that a very sensitive reference voltage signal can be generated in an easy and reliable manner by using a simple adding unit.

According to a further embodiment of the invention the second voltage control signal is given by the sum of a frequency droop voltage signal provided by the frequency droop gain unit and the voltage controller signal. This may provide the advantage that a highly precise and for the desired control actions highly reliable second voltage control signal will be produced.

According to a further embodiment of the invention the actual angle signal further depends on a frequency reference signal being indicative for the nominal frequency of an AC system which collects AC power generated by the wind turbine and by other wind turbines of the wind park.

Taking into account also the nominal frequency of the AC system for calculating the actual angle signal may provide the advantage that, without using a frequency controller the operation of the network bridge respectively of the whole wind turbine can be optimized also towards the actual electric operational state of the AC system. As a consequence, the power generation of a plurality of wind turbines will be coordinated automatically in such a manner that with regard to the frequency the respectively generated electric power of all wind turbines can be collected effectively.

Preferably, the nominal frequency of the AC system is given by the frequency of the utility grid which in normal operation of the wind park receives all the generated power. Descriptive speaking, the value of the nominal frequency may be seen as to represent a "DC-component" and the above described power controller frequency signal provided by the power controller may be seen as to represent a correcting quantity in order to end up with the given nominal frequency.

According to a further embodiment of the invention the theta integrator unit receives an input signal which comprises the sum of the power controller frequency signal and the frequency reference signal. This may provide the advantage that a highly precise and for the desired control actions highly reliable actual angle signal will be provided to the PWM generator driving the network bridge.

Preferably, the theta integrator unit receives only or solely this input signal which comprises the sum of the power controller frequency signal and the frequency reference signal. This input signal for the theta integrator unit may be given by the sum power controller frequency signal and the frequency reference signal. This means that there are no other signals involved which are used by the theta integrator unit in order to determine the actual angle signal.

According to a further embodiment of the invention the input signal for the theta integrator unit comprises the sum of (a) the power controller frequency signal, (b) the frequency reference signal, and (c) a frequency modification signal. This frequency modification signal is based on an reactive power feedback signal. A QDroop block may be used for determining the frequency modification signal based in particular solely on the reactive power feedback signal.

The reactive power feedback signal may be provided by a voltage, current and/or power feedback unit, which collects from the respective wind turbine voltage and current feedback signals as well as the actual angular speed respectively the actual rotational frequency of rotating dq reference frame and the actual rotating angle of the rotating dq reference frame both with respect to the stationary abc reference frame.

According to a further embodiment of the invention the method further comprises (a) receiving, by means of a power feedforward unit, the active power reference signal; and (b) generating, by means of the power feedforward unit, a power feedforward voltage signal. Thereby, the first voltage control signal is further determined based on the power feedforward voltage signal.

Using the power feedforward voltage signal provided by the described power feedforward unit as a part of or a contribution to the first voltage control signal may provide the advantage that the first voltage control signal will have a value which is appropriate for a precise and reliable control of the PWM generator. As a consequence the network bridge will be driven in such a manner that the above mentioned TI1, TI2, and TI3 can be realized even more precisely.

According to a further embodiment of the invention the first voltage control signal is given by the sum of an output signal of the power controller, which output signal is associated with the first voltage control signal, and the power feedforward voltage signal. This may provide the advantage that a highly precise and for the desired control actions highly reliable first voltage control signal will be produced.

According to a further aspect of the invention there is provided a network bridge controller for controlling the operation of a network bridge of a power converter of a wind turbine, wherein the network bridge controller is capable of adopting a configuration having in an activated state a power controller, a theta integrator unit, and a frequency droop gain unit. The network bridge controller is configured for performing an operational control of the wind turbine by carrying out the control method as defined above.

Also this network bridge controller is based on the idea that by determining the described control signals, i.e. the first voltage control signal, the second voltage control signal, and the actual angle signal in accordance with the control method described above, a comprehensive control of a whole power generating and forwarding system can be realized. Thereby, in a beneficial manner, all connected wind turbines of the wind park can operate in an autonomous manner, i.e. without relying on any communicational interaction with at least one other wind turbine in order to achieve the dual objectives of (a) satisfying a local power demand for each wind turbine and (b) achieving a power balance between the AC system and the power exported via the HVDC rectifiers.

It is pointed out that in the described configuration of the network bridge controller, which configuration comprises appropriate and sufficient activated controller components for carrying out the above described control method, a frequency controller is neither necessary nor used. This means that a whole power generating and forwarding system comprising a wind park with a plurality of wind turbines including the mentioned wind turbine, an AC system with which the AC power being produced by the plurality of wind turbines is collected, a HVDC power transmission system, and a AC auxiliary power transmission system can be controlled in a highly precise and reliable manner, if this power generating and forwarding system is in an operational mode, in which the wind park is connected to an utility grid solely via the AC auxiliary power transmission system.

According to an embodiment of the invention the network bridge controller further comprises a voltage controller (a) for receiving (i) a reference voltage signal being indicative for an AC voltage which is supposed to be provided by the network bridge and (ii) a magnitude of a feedback voltage being indicative for the AC voltage which is actually provided by the network bridge and (b) for determining a voltage controller signal based on the magnitude and on the reference voltage signal. Thereby, the second voltage control signal is further determined based on the voltage controller signal.

As has already been mentioned above taking into account the described voltage controller signal means that the operation of the PWM generator is at least partially influenced by the generated voltage such that the described control method allows for controlling the operation of the network bridge in a highly reliable manner, wherein the in particular above mentioned TI1, TI2, and TI3 can be realized precisely.

According to a further aspect of the invention there is provided a wind turbine comprising (a) a mechanical drive train having a wind rotor with at least two rotor blades; (b) an electric generator being mechanically connected to the drive train; (c) a power converter being electrically connected to the generator, wherein the power converter comprises (i) an AC-DC generator bridge for rectifying an AC power input provided by the generator, (ii) a direct current link receiving the rectified an AC power input, and (iii) a DC-AC network bridge which converts a DC power of the DC link into an AC output power output; and (d) a network bridge controller as specified above.

This wind turbine is based on the idea that the above described network bridge controller allows the wind turbine to be operated within a wind park comprising also a plurality of other (adjacent) wind turbines in an autonomous manner. This means that there is no communication necessary between the different wind turbines respectively between wind turbine controllers of different wind turbines in order to allow for coordinated electric power production, wherein in particular the above mentioned TI3 can be realized effectively.

According to a further aspect of the invention there is provided a power generating and forwarding system comprising (a) a wind park comprising a plurality of wind turbines; (b) an AC system for collecting the AC power being generated by the plurality of wind turbines; (c) a HVDC power transmission system being connectable to the AC system and/or to a utility grid for transferring DC power from the AC system to the utility grid, wherein the HVDC power transmission system comprises a HVDC diode rectifier, a HVDC power transmission cable, and a DC-AC converter; (c) an AC auxiliary power transmission system being connectable to the AC system and/or to the utility grid for transferring AC power between the utility grid and the AC system and in particular from the utility grid to the AC system. Thereby, at least some of the wind turbines are a wind turbine as specified above.

This power generating and forwarding system is based on the idea that a plurality of the above described wind turbines, even when being operated in an autonomous manner, can make from a technical point of view an important contribution to an effective and reliable HVDC power transfer via the HVDC power transmission system. When generating electric power with a wind park having a plurality of wind turbines as described in this document, compared to known HVDC power transmission systems, the HVDC power transmission system described in this document can be realized with electric power devices, which compared to actively controlled switches being used e.g. for a full bridge voltage source converter are less complex devices since they are passive components (diodes). This means that for the described HVDC power transmission system in particular the high power AC-DC converter can be realized in a less complex, smaller and lighter design as compared to the design of a high power AC-DC converter being used for a known HVDC power transmission system.

According to a further aspect of the invention there is provided a computer program for controlling the operation of a wind turbine. The computer program, when being executed by a data processor and in particular by a data processor of a wind turbine controller and/or of a network bridge controller, is adapted for controlling and/or for carrying out the above specified control method.

As used herein, reference to a computer program is intended to be equivalent to a reference to a program element and/or to a computer readable medium containing instructions for controlling a computer system to coordinate the performance of the above described method.

The computer program may be implemented as computer readable instruction code in any suitable programming language, such as, for example, JAVA, C++, and may be stored on a computer-readable medium (removable disk, volatile or non-volatile memory, embedded memory/processor, etc.). The instruction code is operable to program a computer or any other programmable device to carry out the intended functions. The computer program may be available from a network, such as the World Wide Web, from which it may be downloaded.

The invention may be realized by means of a computer program respectively software. However, the invention may also be realized by means of one or more specific electronic circuits respectively hardware. Furthermore, the invention may also be realized in a hybrid form, i.e. in a combination of software modules and hardware modules.

It has to be noted that embodiments of the invention have been described with reference to different subject matters. In particular, some embodiments have been described with reference to method type claims whereas other embodiments have been described with reference to apparatus type claims. However, a person skilled in the art will gather from the above and the following description that, unless other notified, in addition to any combination of features belonging to one type of subject matter also any combination between features relating to different subject matters, in particular between features of the method type claims and features of the apparatus type claims is considered as to be disclosed with this document.

The aspects defined above and further aspects of the present invention are apparent from the examples of embodiment to be described hereinafter and are explained with reference to the examples of embodiment. The invention will be described in more detail hereinafter with reference to examples of embodiment but to which the invention is not limited.

BRIEF DESCRIPTION

Some of the embodiments will be described in detail, with reference to the following figures, wherein like designations denote like members, wherein.

DETAILED DESCRIPTION

Figure 1:
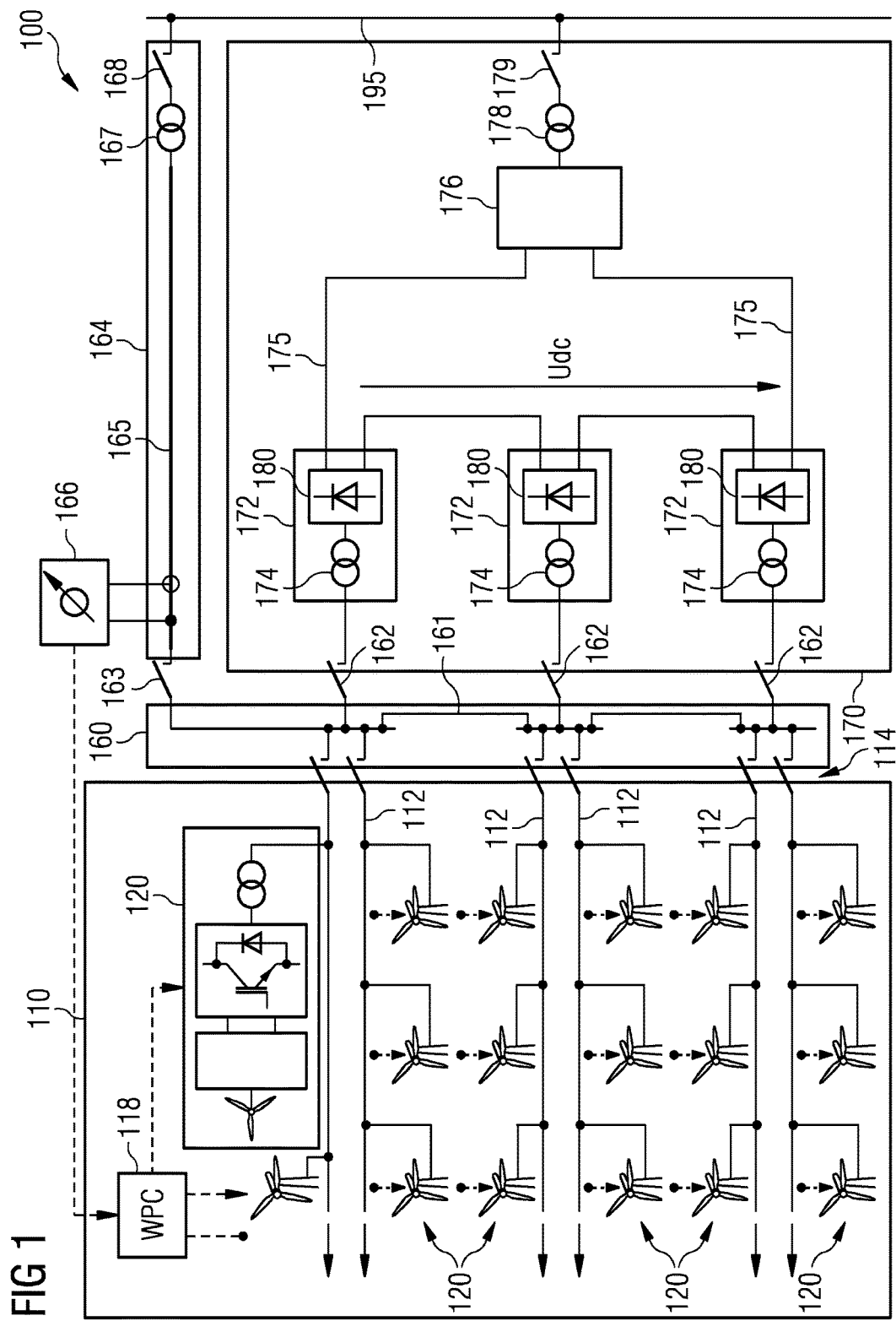
FIG. 1 shows a power generating and forwarding system comprising a wind park with a plurality of wind turbines in accordance with an embodiment of the invention.

The illustration in the drawing is schematically. It is noted that in different figures, similar or identical elements or features are provided with the same reference signs or with reference signs, which are different from the corresponding reference signs only within the first digit. In order to avoid unnecessary repetitions elements or features which have already been elucidated with respect to a previously described embodiment are not elucidated again at a later position of the description.

FIG. 1 shows a power generating and forwarding system 100 comprising a wind park 110 with a plurality of wind turbines 120. The electric energy generated by the wind park 110, which according to the embodiment described here is located offshore, is forwarded via a HVDC power transmission system 170 to the power grid 195, which is located onshore.

The wind turbines 120 are arranged in groups, wherein each group is assigned to a bus bar 112. As indicated by the arrows at the left side of the illustration of the wind park 110, the number of wind turbines 120 being connected to one bus bar 112 is not restricted. Each bus bar 112, which may also be called a collector string, is connected via a circuit breaker 114 to an AC power transmission system 160.

The wind park 110 comprises a central wind park controller (WPC) 118 which is communicatively connected to each one of the wind turbines 120 by means of control lines. In FIG. 1, within the wind park 110, these control lines are indicted by dashed lines. In order not to obscure FIG. 1 the dashed lines connecting the WPC 118 with the wind turbines 120 not being assigned to the upper most branch are depicted in an interrupted manner. The respective end points of the interruption are indicated as filled circles. It is pointed out the control lines respectively the corresponding data transfer via these control lines may be realized by means of a wired or a wireless data connection.

The WPC 118 may be a so called High Performance Park Pilot (HPPP) controller which acts as a superordinate controller for all individual wind turbine controllers (not depicted in FIG. 1). By supervising the individual wind turbine controllers the WPC 118 may control the operation of the individual wind turbines 120 in a coordinated manner. Further, via the control lines to the individual wind turbines 120, the WPC 118 can collect operational information regarding the individual wind turbines 120 and can transmit appropriate control signals to the respective individual wind turbine controllers.

The power generating and forwarding system 100 further comprises an AC system 160 which comprises a bus bar 161 and power switches 162. At the bus bar 161 the electric power collected by the bus bars 112 is summed up. When the power switches 162 are closed, the AC system 160 is connected to a HVDC power transmission system 170, which is described below in more detail.

As can be seen from FIG. 1, the AC system 160 further comprises a switch 163. When the switch 163 is closed, the offshore AC system 160 is connected to an AC auxiliary power transmission system 164. As can be seen from FIG. 1, the AC auxiliary power transmission system 164 comprises an AC auxiliary power transmission line or umbilical AC cable 165, by means of which an AC power connection between the power grid 195 and the AC system 160 respectively the wind park 110 can be established, if necessary. As has already been mentioned above, a power transfer via the umbilical AC cable 165 may be required for a start-up phase of at least some wind turbines 120 of the wind park 110 when the power generation of the other wind turbines 120 is not sufficient in order to allow for a reliable start-up procedure.

According to the embodiment described here, the AC auxiliary power transmission system 164 comprises a 3 phase umbilical power transformer 167 and a switch 168, which, together with the switch 163 can be used to connect the offshore AC system 160 to the onshore AC system 195 via the AC auxiliary power transmission system 164.

As can be further seen from FIG. 1, the AC auxiliary power transmission system 164 comprises a power measurement device 166 for measuring the power being shipped in particular from wind park 110 to the power grid 195. The corresponding power measurement is carried out in a known manner via a voltage measurement and a current measurement as indicated in FIG. 1 with the two lines connecting the power measurement device 166 with the umbilical AC cable 165. The measured power value is forwarded to the WPC 118 which, when coordinating the operation of the wind turbines 120, takes into account the actual level of power being shipped via the umbilical AC cable 165.

The HVDC power transmission system 170 comprises a plurality of (in the depicted embodiment of the invention three) diode rectifier power modules 172, each comprising a three phase rectifier 180 and a respective three phase transformer 174. The diode rectifier power modules 172 are used for converting the provided AC power into a DC power. The diode rectifier power modules 172 are connected in such a manner that between one output terminal of the three phase rectifier 180 of the upper diode rectifier power module 172 and one output terminal of the three phase rectifier 180 of the lower diode rectifier power module 172 the DC power having a voltage Udc is provided.

As has already been mentioned above, according to the embodiment described here the wind park 110 is located offshore. The same holds for the diode rectifier power modules 172 and the power switches 162 and 163. For shipping the generated power from offshore to onshore a HVDC power transmission cable 175 is used. Onshore the HVDC power transmission system 170 comprises an onshore DC-AC converter 176 and a transformer 178, which deliver the resulting AC power with a proper phase and a proper amplitude to the power grid 195 (in case a power switch 179 is closed).

In the following a possible structural design of one wind turbine 120 will be described with reference to FIG. 2.

The exemplary wind turbine 120 comprises wind rotor 222, which is mounted to a drive shaft 228. The wind rotor 222 comprises a non-depicted hub, at which a certain number and preferably three rotor blades 224 are attached. Each rotor blade 224 can be rotated around its longitudinal axis by means of a rotor blade adjustment system 226 in order to adjust a pitch angle of the respective rotor blade 224. In accordance with basic principles of wind turbines, the pitch angle is an important parameter for the mechanical power, which will be extracted from the wind power being available in total.

The wind turbine 120 further comprises an electric generator 230, which includes a generator rotor 232, which is driven by the drive shaft 228. In this respect it is mentioned that the wind turbine 120 depicted here is a so called direct drive wind turbine 120, which does not comprise a gear box being connected between the wind rotor 222 and the generator 230 and which may be used for increasing the rotational speed of a further drive shaft being mechanically connected to the generator rotor 232. Of course, also a wind turbine having a configuration with a gear box can be used.

The electric generator 230 comprises a stator 234 having a winding system with which the electric power, typically a three phase power, is generated. Downstream with respect to the stator 234 there is connected a power converter 240. The power converter 240 comprises a generator (AC-DC) bridge 242, which in normal operation operates as an active rectifier to supply power to a direct current (DC) link 244. The power converter 240 further comprises a network bridge 246 which converts the DC power of the DC link 244 to an AC power output. According to the embodiment described here this AC power output comprises a three phase current and is fed via a line reactor 247 to a step-up transformer 248. The (power) output of the step-up transformer 248 is fed to the respective bus bar 112 shown in FIG. 1.

The wind turbine 120 comprises and is controlled by a wind turbine controller (WTC) 250. The WTC 250 itself is controlled by the wind park controller (WPC) 118 shown in FIG. 1. The respective wired or wireless data connection is indicated in FIG. 1 by means of a dashed line extending from the box 250 towards the right.

Figure 2:
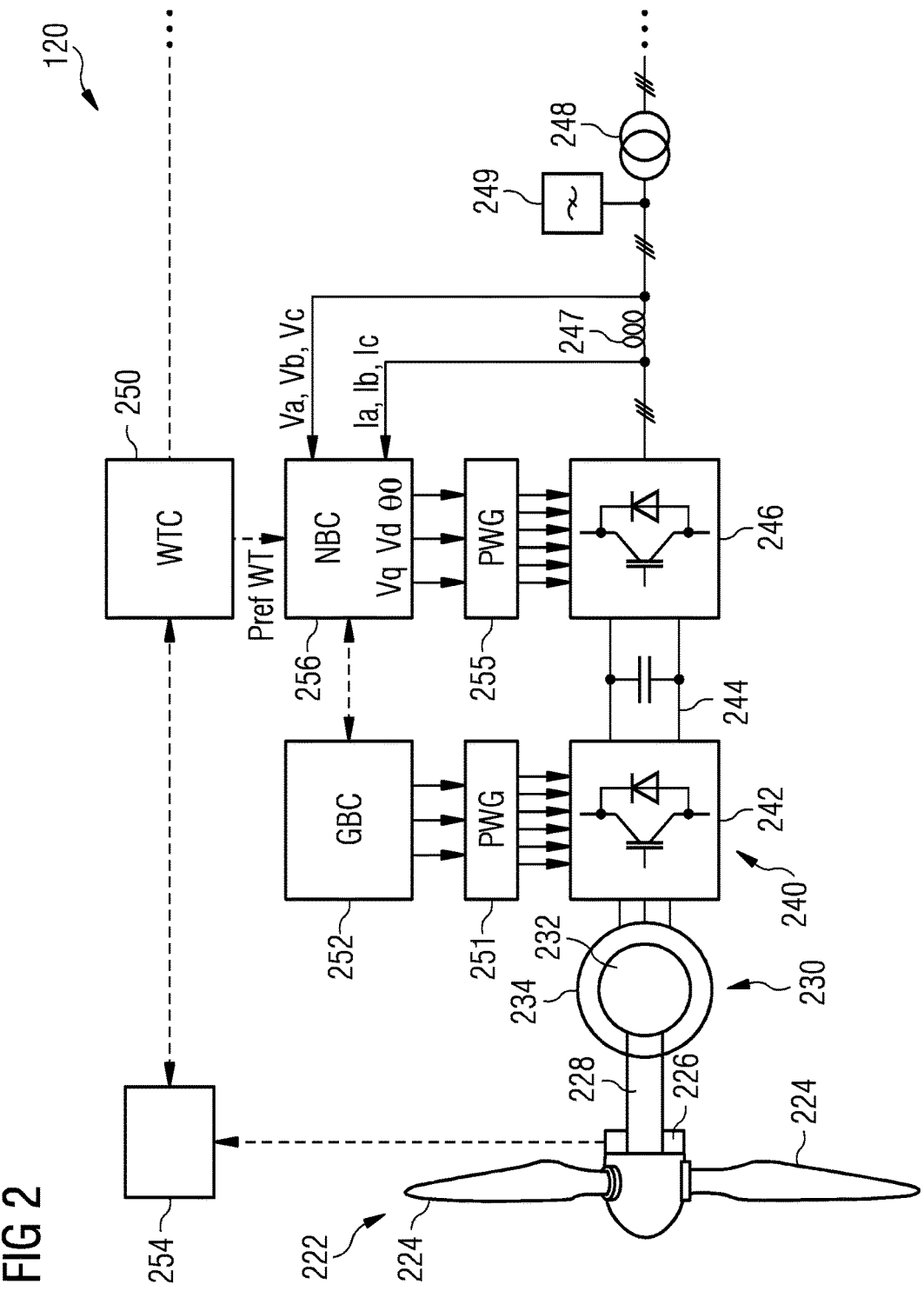
FIG. 2 shows a wind turbine of the wind park depicted in FIG. 1, wherein the wind turbine is equipped with a power converter and controller devices for controlling the operation of the power converter.

As can be seen from FIG. 2, a pitch controller 254 of the wind turbine 120 is controlled by the WTC 250. The pitch controller 254 controls, in a known manner, the operation of a pitch adjustment system 226, which is responsible for setting, depending on the actual operational state of the wind turbine 120, the blade pitch angle of each rotor blade 224.

The wind turbine 120 further comprises a generator bridge controller (GBC) 252 and a network bridge controller (NBC) 256. According to the embodiment described here, the NBC 256 is communicatively directly connected to the WTC 250 whereas the GBC 252 is connected indirectly to the WTC 250 via the NBC 256. As can be seen from FIG. 2, the GBC 252 controls the operation of a Pulse Width Modulation (PWM) generator (PWG) 251, which itself drives the six sets of semiconductor power switches of the generator bridge 242 such that the AC power input provided by the electric generator 230 is converted to a DC power being fed to the DC bridge 244. Correspondingly, the NBC 256 controls the operation of a PWM generator 255, which itself drives the six sets of semiconductor power switches of the network bridge 246 such that the DC power output provided by the DC bridge 244 is converted to an AC power output being fed to the transformer 248. An optional PWM filter 249 is provided in order to reduce harmonic components of the switching frequency of the PWM network bridge 246.

At this point it is mentioned that throughout this document reference is often made to d axis quantities (i.e. voltages and currents) and q axis quantities. The controller described within this document exits control signals within the so called synchronously rotating dq reference frame which is aligned such that the q axis component of voltage is in phase with the AC voltage and the d axis component is perpendicular to the q axis component.

In accordance with known control schemes or control algorithms the control of the PWM generator 252 by means of the GBC 252 and in particular the control of the PWM generator 255 by means of the NBC 256 is based on a signal processing of control signals which is carried out within the synchronously rotating dq reference frame. As is commonly known, this dq reference frame results from a dq transformation, i.e. a so called Park or Clarke transformation, of the so called stationary abc reference frame. The angular speed respectively the rotational frequency of the rotating dq reference frame with respect to the stationary abc reference frame is given by $\overline{\omega}0$.

In the case of balanced three phase electric quantities (e.g. voltages Va, Vb, Vc and/or currents Ia, Ib, Ic), applying the dq transformation reduces the three AC quantities to two DC quantities in the steady state (e.g. Vd, Vq and/or Id, Iq). As a consequence, simple PI controllers can be used within the dq frame to achieve zero steady state error before performing the inverse transformation to recover the actual three phase AC modulation signals for the PWM generator 255.

As can be seen from FIG. 2, the two voltage quantities Vd and Vq and the angle θ0 are output control signals of the NBC 256 which output control signals control the operation of the PWM generator 255 driving the network (DC-AC) bridge 246. As can be further seen from FIG. 2, these output control signals Vd, Vq, and θ0 are calculated respectively determined by the NBC 256 based in the following input signals:

(1) A power reference signal PrefWT which is provided by the WTC 250 and which indicates the electric power which is supposed to be generated by the wind turbine 120.
(2) Three current feedback signals Ia, Ib, and Ic obtained by means of appropriate current measurements at the three phase output of the network bridge 246. These signals Ia, Ib, Ic, which are representative of the actual current of the 3 phase Low Voltage (LV) at the node interconnecting the output of the network bridge 246 and the line reactor 247.
(3) Three voltage feedback signals Va, Vb, and Vc obtained by means of appropriate voltage measurements at the three phase output of the network bridge 246. According to the exemplary embodiment described here the feedback signals Va, Vb, and Vc are obtained at a node between the line reactor 247 and the step-up transformer 248 of the wind turbine.

These currents and voltages are measured via transducers, and then the output of the transducers sampled by Analog to Digital Converters (ADC). This means that the terms "current feedback signal" and "voltage feedback signal" used here and also in the rest of this documents may refer to software signals representing these power hardware variables.

In this respect it is mentioned that according to the exemplary embodiment described here also the generator bridge controller 252 receives corresponding feedback signals being indicative for voltage and the current provided by the generator 232. However, for the sake of conciseness of FIG. 2 the respective feedback loops are not depicted.

The PWM generator 255 receives (a) the control signals Vd, Vq being indicative for the required voltage magnitude and phase at the voltage output of the network bridge 246 and (b) the angle θ0 being indicative for the required frequency of the voltage output of the network bridge 246. The PWM generator 255 calculates, based on these received input variables, the required switching pattern for the (IGBT) semiconductor switches to realize a three phase set of balanced fundamental frequency voltages with a magnitude of sqrt(Vq^2+Vd^2) and an angle θd relative to the network bridge output voltages Va, Vb, and Vc. In this document this angle θd will be referred to as power angle. This power angle θd represents the angle difference between the network bridge PWM modulated output voltages Va, Vb, and Vc and the rotating dq reference frame (which is aligned with the actual voltage at the bus bar 112). During a steady state operation the power angle θd will stay constant.

Industry standard techniques such as sine triangular comparison or Space Vector Modulation can be used to calculate the PWM switching times of the six power semiconductor switches of the network bridge 246. Since this type PWM modulation is well known by persons skilled in the art, in this document a further elucidation will be omitted. It is mentioned that a corresponding PWM modulation is also needed for the generator bridge 242 operating independent from the network bridge 246. Therefore, the independent PWM generator 251 being controlled by the GBC 252 are provided. According to the exemplary embodiment described here the GBC 252 itself is controlled indirectly by the WTC 250 via the NBC 256.

It is further mentioned that the power flow into the AC (power) system 160 is defined by the relationship between the sending end voltage at the output node of the network bridge 256 and the receiving end voltage at the bus bar 161. Electrically, the wind turbines 120 are connected in parallel thus it is quite possible (highly likely, and a requirement) that each wind turbine 120 can operate with a power angle θd being different to the power angle θd of the network bridge 256 of an adjacent wind turbine 120.

Figure 3:
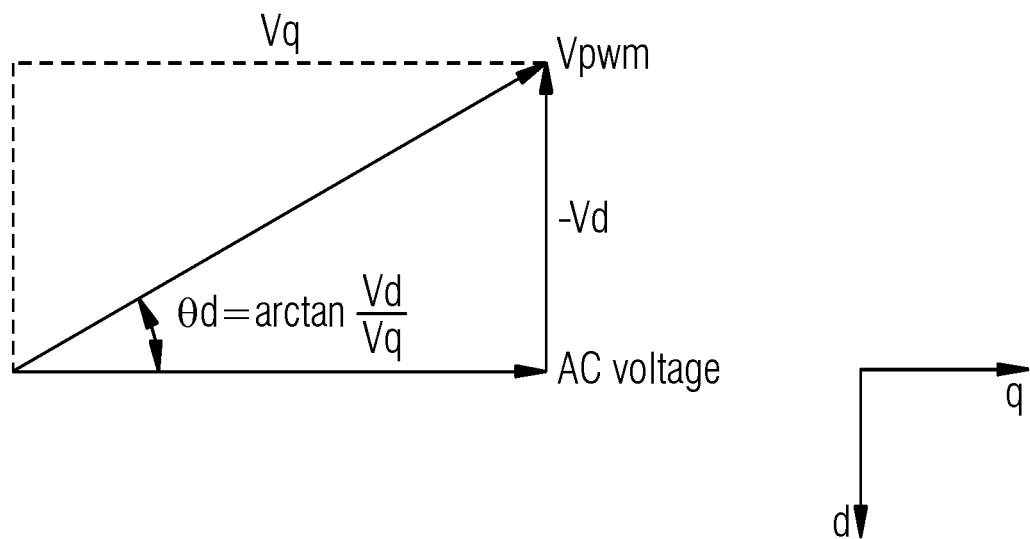
FIG. 3 illustrates, in a rotating dq reference frame, the relationship between (a) a modulated voltage Vpwm and voltage control signals Vd and Vq.

In accordance with known control procedures the PWM generator 255 modulates a three phase balanced set of voltages where the q axis voltage component Vq is nominally in phase with the AC voltage (e.g. 66 kV) at the bus bar 112 and the d axis voltage component Vd defines the component of this AC voltage that is in quadrature to the AC voltage at the bus bar 112. θ0 is the actual rotational angle at frequency $\overline{\omega}0$. Thus the power angle θd between a modulated voltage Vpwm, which in the rotating dq reference frame is defined by the vector sum of Vd and Vq, and the AC voltage at the bus bar 112 is defined by arctan (Vd/Vq) as stated above. This relationship is illustrated with FIG. 3.

To summarize, the AC Power flow from the wind turbine 120 to the bus bar 112 is controlled by a modification of the voltage angle θd between Vpwm and the AC voltage at the bus bar 112. As can be seen from FIG. 3, the quantity Vd defines this angle θd.

Figure 4:
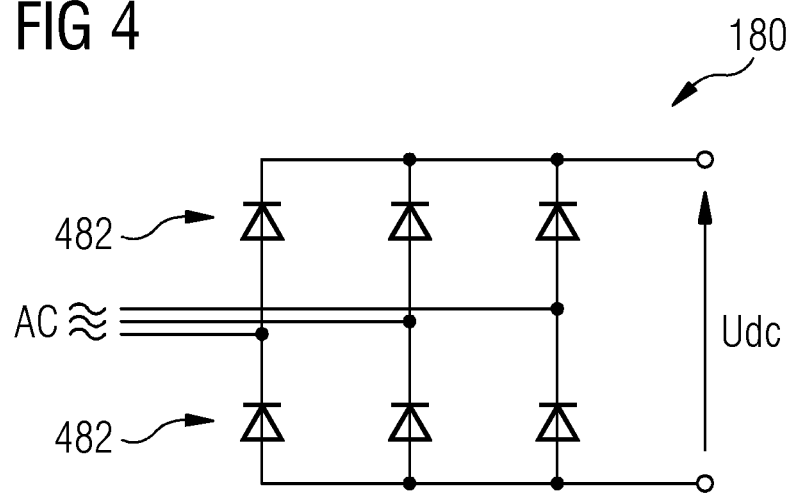
FIG. 4 shows a rectifier of the HVDC power transmission system depicted in FIG. 1.

FIG. 4 shows the rectifier 180 in more detail. By contrast to a power AC-DC converter having typically six controllable high power semiconductor switches, the rectifier 180 has only passive power electric components which are power diodes 482. As can be seen from FIG. 3, the rectifier 180 comprises three half bridges each of which connect between two DC output terminals. Between these two output terminals the output Voltage Udc is provided. Each half bridge comprises a series connection of two power diodes 482. At an intermediate node between the two power diodes 482 of each half bridge, which intermediate node is not provided with a reference numeral, there is applied one phase of a three phase AC power signal being fed into the rectifier 180.

Figure 5:
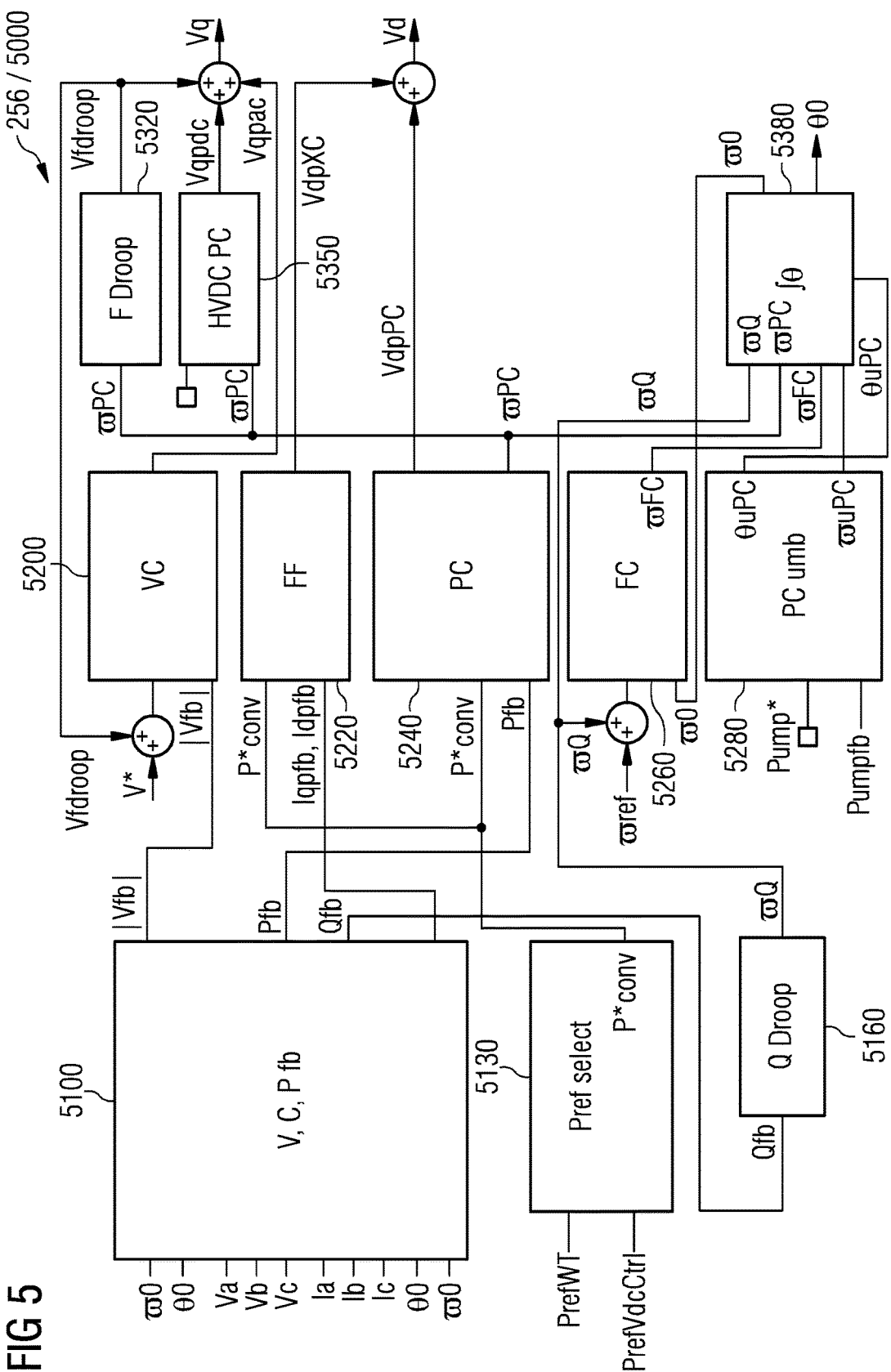
FIG. 5 shows in accordance with an embodiment of the invention a network bridge controller for controlling the operation of the network bridge depicted in FIG. 2.

FIG. 5 shows the network bridge controller (NBC) 256 in accordance with a preferred embodiment of the invention, which NBC 256 is already depicted in FIG. 2. In order to facilitate the assignment of reference numerals in the following description the NBC 256 will also be denominated with reference numeral 5000.

At this point it is recalled that the NBC 5000 described in this document is capable of resolving several technical issues which are listed below. These technical issues are caused by the offshore rectifier based HVDC power transmission system 170, whereby power is transferred from the offshore wind park 110 to the onshore AC power grid by means of (a plurality of series connected) uncontrolled passive offshore HVDC diode rectifiers 180. Specifically, when operating in the so called HVDC rectifier mode only (i.e. the umbilical AC cable 165 is disconnected), the only offshore voltage source is the network (DC-AC) bridge 246 of the wind turbines 120 and therefore the voltage and the frequency of the offshore AC system 160 need to be defined by and controlled by the action of multiple autonomous wind turbines 120, wherein in particular their network (DC-AC) bridges 246 act in a coordinated manner.

In the event of a no-wind condition then the auxiliary systems within the wind turbines 120, such as an environmental control system, aircraft warning lights, supervisor computers, etc. need to be provided with power in order to allow a proper operation e.g. in a subsequent start-up phase. Since the diode rectifier 180 does not permit a bi-directional power flow, this power needs to be provided via the umbilical AC cable 165 of the umbilical power transmission system 164. This AC cable 165 may have a power rating which is for example 3% of the total wind park 110 power rating.

In this context it is pointed out that in the following the wind park 110 is located offshore. However, this may not be the only application of the technical solution described in this document. It is also possible that this solution could be used for a remote onshore wind park and/or as an interconnection between an island containing an onshore windfarm with the mainland.

In the following the Technical Issues (TI) which are caused in particular by the use of the uncontrolled passive offshore diode rectifier 180. These TI are related to different Operational Modes (OM) of the whole system 100. In detail, there is required a means for . . .

TI1: . . . controlling the power flow within any individual wind turbine 120 in order to satisfy the local wind turbine power demand when
the wind park 110 is connected to the AC power grid 195 only via the umbilical power transmission system 164 (OM1).

TI2: . . . controlling the aggregated voltage from the multiple autonomous wind turbines 120 at the AC system 160 for OM1.

TI3: . . . controlling the power flow via the umbilical power transmission system 164 for OM1.

TI4: . . . controlling the power flow from multiple autonomous wind turbines 120 into the HVDC Diode rectifier 180 when
the wind park 110 is connected to the AC power grid 195 only via the HVDC power transmission system 170 (OM2).

TI5: . . . controlling the power flow from multiple autonomous wind turbines 120 into the umbilical power transmission system 164 when
the wind park 110 is connected to the AC power grid 195 via both the HVDC power transmission system 170 and umbilical power transmission system 164 (OM3).

TI6: . . . controlling the aggregated voltage collected from the multiple autonomous but coordinated wind turbines 120 at the AC system 160 when the wind park 110 is connected to the AC power grid 195 via the HVDC power transmission system 170 irrespective of the status (i.e. activated or deactivated) of the umbilical power transmission system 164 (OM2, OM3).

TI7: . . . providing the total reactive power required (a) by all inductive and the capacitive elements of the entire offshore system 110, 114, 160 and (b) by the diode rectifier power modules 172 by means of all wind turbines 120 equally for OM2.

TI8: . . . providing the total reactive power required by all inductive and the capacitive elements of the entire offshore system 110, 114, 160 from the AC umbilical power transmission system 164 and/or from all wind turbines 120 equally for OM1. In this respect it is pointed out that in OM1 the AC umbilical power transmission system 164 can provide a reactive power balancing, i.e. it can act as a sink/source of reactive power.

TI9: . . . controlling the frequency of the system consisting of the wind park 110 and the HVDC diode rectifier 180 to a reference value for OM2.

As can be seen from FIG. 5, the network bridge controller 5000 comprises a plurality of subunits (i.e. controller units, signal processing units, calculation units etc.), which can be selectively activated respectively used for, depending on the actual operational mode, solving the above specified TI1, TI2, and TI3.

Specifically, the network bridge controller 5000 comprises a voltage, current and/or power feedback unit 5100 which receives, as can be taken also from FIG. 2, (i) the current feedback signals Ia, Ib, Ic and/or (ii) the voltage feedback signals Va, Vb, Vc. Further input signals for the feedback unit 5100 are (iii) the angular speed respectively the rotational frequency of the rotating dq reference frame $\overline{\omega}0$ and (iv) the rotation angle of the dq reference frame θ0. Based on an appropriate selection of these input signals the voltage, current and/or power feedback unit 5100 calculates
(a) a magnitude |Vfb| of the feedback voltage being characterized by the voltage feedback signals Va, Vb, Vc,
(b) an active power feedback signal Pfb,
(c) a reactive power feedback signal Qfb, and
(d) current feedback signals Iqpfb and Idpfb.
The current feedback signals Iqpfb is indicative of the positive sequence real component of the current. The current feedback signal Idpfb is indicative of the positive sequence reactive component of current.

The network bridge controller 5000 further comprises a power reference selection block 5130 which receives (i) a power reference signal PrefWT from the wind turbine controller 250 depicted in FIG. 2 and (ii) a further power reference signal PrefVdcCtrl from a DC link voltage controller, which will be utilized when the wind turbine 120 is running in a so called voltage control mode (V mode). In this mode the generator bridge 242 is disabled, and the wind turbine 120 does not produce power. The wind turbine 120 is rather acting as an AC voltage controller. In order to do so the DC link 244 of the power converter 240 must be energized and controlled to a reference, and this is done by the mentioned DC link voltage controller, which outputs the signal PrefVdcCtrl.

Based on PrefWT or PrefVdcCtrl the power reference selection unit 5130 determines a modified power reference signal P*conv representing a power reference which has been modified by appropriate signal processing procedures such as e.g. filter actions, ramp limitations, etc.

Further, the network bridge controller 5000 comprises a reactive power droop gain unit (Q Droop) 5160 which, as can be taken from FIG. 5, receives the reactive power feedback signal Qfb and provides a frequency modification signal $\overline{\omega}Q$ which, as can be seen from the elucidation given below, causes an effective modification and in particular a reduction of a frequency reference signal $\overline{\omega}$ref which is used for the control procedure described here. The frequency reference signal ωref can be provided e.g. by the wind turbine controller 250 (see FIG. 2) and/or by the wind park controller 118 (see FIG. 1).

As can be seen from FIG. 5, the network bridge controller 5000 further comprises a voltage controller (VC) 5200, a power feedforward (FF) unit 5220, a power controller (PC) 5240, a frequency controller (FC) 5260, and a umbilical power controller (PC umb) 5280 for the umbilical power transmission system 164 depicted in FIG. 1. The VC controller 5200, the PC 5240, the FC 5260, and/or the PC umb 5280 may be e.g. a proportional-integral (PI) controller.

In the following the operation of these blocks will be described:

According to the embodiment described here the VC 5200 receives two signals. A first signal is the magnitude of feedback voltage |Vfb| being provided by the voltage, current and/or power feedback unit 5100. The other signal is the sum of (i) a reference voltage (signal) or set point voltage V*, which may be provided by the wind turbine controller 250, and (ii) a frequency droop voltage signal Vfdroop which will be described below. Based on the signals |Vfb| and the sum of V* and Vfdroop the VC 5200 derives a voltage controller (VC) signal Vqpac that forms, in the dq reference frame, a part of the Q axis voltage control signal Vq for the PWM 255.

The power FF unit 5220 determines, based on the signals P*conv and Iqpfb, Idpfb, a power feedforward voltage signal VdpXC that forms, in the dq reference frame, a part of the D axis voltage control signal Vd for the PWM 255. The technical meaning of VdpXC will be explained below.

The PC 5240 determines, in response to the signals P*conv and Pfb, a power controller (PC) frequency signal $\overline{\omega}$PC which (indirectly, via the HVDC PC 5350) contributes to the Q axis voltage control signal Vq for the PWM 255. The PC 5240 further determines, also in response to the signals P*conv and Pfb, a power controller (PC) voltage signal VdpPC. This signal VdpPC is added to the above described power feedforward voltage signal VdpXC and the result of the corresponding summation represents the D axis voltage control signal Vd for the PWM 255. With regard to its technical meaning VdpPC is a component of the D axis voltage control signal Vd, which is indicative for the derivative of the power error. VdpPC acts to improve the dynamic response of the power controller and also provides beneficial damping to the overall control response of the wind turbine 120.

The FC 5260 determines, based on the frequency signal $\overline{\omega}0$ (i.e. the angular speed respectively the rotational frequency of rotating dq reference frame) mentioned above and the sum of the frequency modification signal $\overline{\omega}Q$ and a frequency reference signal $\overline{\omega}$ref, a frequency controller frequency signal $\overline{\omega}$FC. With regard to its technical meaning $\overline{\omega}$FC is a component of frequency which acts with a slow time constant, and acts simultaneously within all wind turbines 120, in order to return the offshore system to its frequency reference. The frequency controller frequency signal $\overline{\omega}$FC acts to control the overall frequency $\overline{\omega}0$ to the desired reference, without modifying the overall power flow in the offshore system.

The PC umb 5280 receives two input signals. A first input signal is a power reference signal Pumb* corresponding to a desired power flow through the umbilical power transmission system 164. The second input signal is a power feedback signal Pumbfb corresponding to the actual power flowing via the umbilical power transmission system 164. Based on these two input signals Pumbfb and Pumb* the PC umb 5280 determines two output signals. A first output signal is a frequency signal $\overline{\omega}$uPC being indicative for the actual power error within the umbilical power transmission system 164. Specifically, the frequency signal $\overline{\omega}$uPC is indicative for the difference between the two input signals Pumbfb and Pumb*. The second output signal in an umbilical power angle signal θuPC.

The combined effect of the two control signals $\overline{\omega}$uPC and θuPC is to change the phase angle of the entire offshore electrical system, i.e. the offshore AC system 160 and the wind park 110 with respect to the onshore electrical system, i.e. the AC power grid 195. In doing so, the power flow via the umbilical power transmission system 164 respectively the umbilical cable 165 is controlled. This controller is active in OM3, and acts simultaneously in all wind turbines 120. θuPC is in effect a derivative of the power error within the umbilical power transmission system and acts to improve the dynamic response of the umbilical power controller 5280.

As can be further seen from FIG. 5, the network bridge controller 5000 further comprises a frequency droop gain unit (F Droop) 5320 receiving the PC signal $\overline{\omega}$PC and outputting the frequency droop voltage signal Vfdroop.

The technical meaning of the signal Vfdroop is to achieve a reactive power sharing between all involved wind turbines 120 when the whole power generating and forwarding system 100 operates in OM1, i.e. when the wind park 110 is connected to the AC power grid 195 only via the umbilical power transmission system 164. An increased reactive power feedback signal Qfb causes an increase in the frequency modification signal $\overline{\omega}Q$ (via Q Droop 5160), which in turn causes the PC frequency signal $\overline{\omega}PC$ to reduce and the Q axis voltage control signal Vq to reduce via the F Droop V 5320. This causes a reduction in the reactive power since the Q axis voltage control signal Vq has reduced.

In this respect one has to consider that an increase in $\overline{\omega}Q$ increases the frequency of the voltage at the bus bar 112. As a consequence, the power angle θd will increase which again will cause an increase of the power flow (from the respective wind turbine 120 to the bus bar 112). The power controller 5240 will act against this effect by reducing its output $\overline{\omega}PC$ ($\overline{\omega}PC$ can even go negative). This reduction in $\overline{\omega}PC$ causes a reduction of Vfdroop produced by F Droop V 5320 and representing the component of Q axis voltage control signal Vq. So locally one has now a wind turbine 120 reducing its output voltage in response to an increase of the reactive power feedback signal Qfb. By this mechanism the wind turbines 120 arrive at steady state reactive power sharing.

Further, the network bridge controller 5000 comprises a HVDC power controller (HVDC PC) 5350 for the HVDC power transmission system 170. The HVDC PC 5350 receives the PC frequency signal $\overline{\omega}PC$ and outputs a HVDC PC voltage signal Vqpdc. Optionally, the HVDC PC 5350 compares the PC frequency signal $\overline{\omega}PC$ with a proper reference signal and the output voltage signal Vqpdc results from the result of the comparing. Preferably, the comparing comprises determining the difference between this proper reference signal and the PC frequency signal $\overline{\omega}PC$.

The output voltage signal Vqpdc is a voltage term which is proportional to the output $\overline{\omega}PC$ of the PC 5240. In other words and as can be seen from FIG. 5, the HVDC PC 5350 acts to add this voltage component Vqpdc modify the Q axis voltage control signal Vq, hence increasing or decreasing the magnitude of the voltage of the offshore AC system 160 shown in FIG. 1. The HVDC PC 5350 operates in OM2 and OM3, and acts on the output of the Power Controller 5240 $\overline{\omega}PC$ to modify the voltage in the offshore AC system 160, and in doing so controls the power flow into the HVDC diode rectifiers 180. It is this link between the power error and the voltage magnitude that allows the entirety of the wind turbines 120 to balance in a collective manner (a) the power flow from the wind turbines 120 into the offshore AC system 160 with (b) the power flow into the HVDC diode rectifiers 180 of the HVDC power transmission system 170.

According to the embodiment described here the voltage control signal Vq results from a summation of the signals Vfdroop, Vqpdc, and Vqpac.

Further, the voltage control signal Vd results from a summation of the signals VdpXC and VdpPC. In this respect it is mentioned that the D axis voltage control signal Vd represents the required voltage drop across the line reactor 247 and the transformer 248 of the wind turbine 120 shown in FIG. 2 in order to establish a required power flow between the network bridge 246 shown in FIG. 2 and the bus bar 112 respectively the offshore AC system 160 shown in FIG. 1. Given that the electrical characteristics of the line reactor 247 and the transformer 248 are known it is thus possible to calculate the required steady state voltage across these components to establish this power flow. This is the purpose of the power feedforward (FF) unit 5220. The signal VdpXC will dominate the contribution to the D axis voltage control signal Vd in the steady state.

Last but not least the network bridge controller 5000 comprises a theta integrator unit (Iθ) 5380 calculating a signal representing the above described angle θ0 (i.e. the actual angle of the rotating dq reference frame).

Strictly speaking, θ0 mentioned here is the rotating part of the angle of the rotating dq reference frame with respect to the stationary abc reference frame, and it is the power angle θd defined by arctan Vd/Vq (see FIG. 3) that defines the angle between the modulated voltage and the stationary abc frame. However it is likely that any errors in the system due to measurements/tolerances of components etc. end up being compensated for by transient components of $\overline{\omega}PC$.

As can be seen from FIG. 5, according to the embodiment described here, the signal "θ0" is determined in response to the above described input signals $\overline{\omega}Q$, $\overline{\omega}PC$, $\overline{\omega}FC$, and θuPC. Further, according to the embodiment described here, the outputs of Iθ 5380, in response to at least some of the mentioned input signals, the above defined signal $\overline{\omega}0$ (i.e. the angular speed respectively the rotational frequency of the rotating dq reference frame).

At this point it is mentioned that at least some of the signals described above and at least some of the signals which will be described below may be analog (voltage) signals or alternatively digital signals representing a digital representation for the corresponding control quantity.

As has already been mentioned above the network bridge controller 5000 can be used for controlling the PWM 255 in an appropriate manner for different Operational Modes (OM) and/or for different Technical Issues (TI) mentioned above. In order to meet the requirements being associated with the different OM and/or TI certain components and/or signal connections within the network bridge controller 5000 can be activated respectively deactivated. In the following various configurations of the network bridge controller 5000 will be described with reference to FIGS. 6 to 10 and in relation to respectively some of the above mentioned TI.

Figure 6:
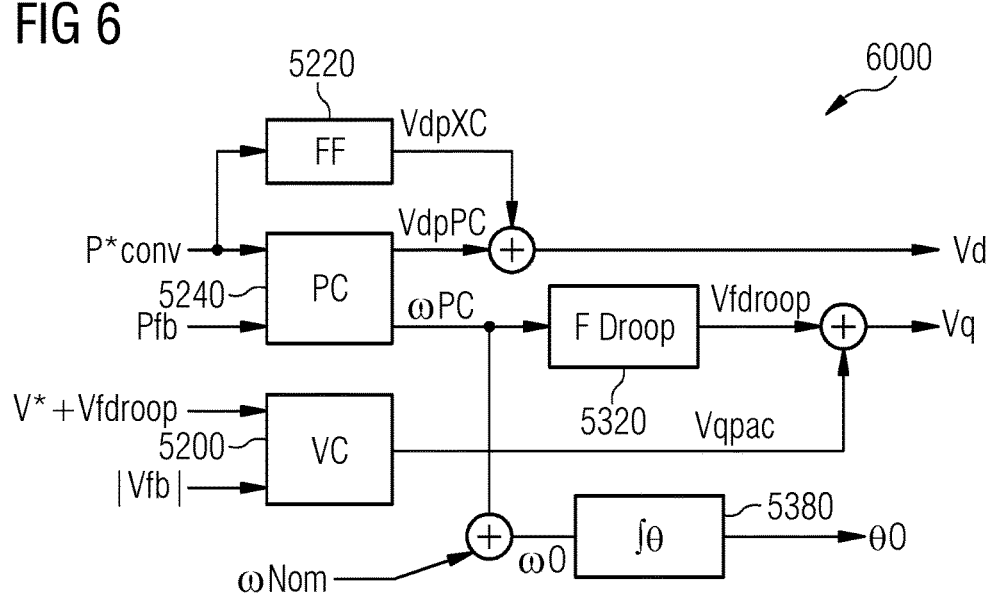
FIG. 6 shows in accordance with an embodiment of the invention a first configuration of the network bridge controller with the activated components being employed in a first operational mode of the power generating and forwarding system.

FIG. 6 shows in accordance with an embodiment of the invention a first configuration 6000 of the network bridge controller 5000, wherein there are illustrated the activated components respectively blocks of the network bridge controller 5000 when being used for the first operational mode OM1 of the power generating and forwarding system 100, in order to satisfy the Power and Voltage control requirements. In other words, FIG. 6 describes the controllers components which in OM1 are active to satisfy (or control) the local power demand to its reference and to ensure that the voltage is controlled to its reference as specified above with TI1 and TI2.

As has already been defined above, in this mode OM1 the wind park 110 is connected to the AC power grid 195 only via the umbilical power transmission system 164. This means that there is no power flow via the HVDC power transmission system 170.

The activated components/blocks of the first configuration 6000, required to resolve TI1, TI2, and TI3, include the power controller (PC) 5240, the voltage controller (VC) 5200, the power feedforward (FF) unit 5220, the frequency droop gain unit (F Droop) 5320, and the theta integrator unit (Iθ) 5380. In addition to the control signals introduced already in FIG. 5, in this configuration 6000 a control signal $\overline{\omega}Nom$ is used. This control signal $\overline{\omega}Nom$ is the nominal frequency of the AC system 160. Depending on the location of the whole power generating and forwarding system 100 ωNom may be e.g. 50 Hz (e.g. in Europe, Asia, etc.) or 60 HZ (e.g. North America).

At this point it is mentioned that the configuration 6000 does neither employ the frequency controller (FC) 5260 nor the umbilical power controller (PC umb) 5280. Since there is no power flow via the HVDC power transmission system 170 there is no need to control the power flow via the umbilical power transmission system 164, because the AC system 160 is simply connected (as a usual power consumer) to the utility grid 195.

In the following it will be elucidated how the above mentioned technical issues TI1, TI2, and TI3 can be handled in a beneficial manner with the configuration 6000 shown in FIG. 6 of the network bridge controller 5000.

TI1: Power Control for Each Individual WT 120

In the OM1 the power is controlled within each WTG by means of the power controller (PC) 5240. The PC 5240 receives the modified power reference signal P*conv (via the power reference selection block 5130 shown in FIG. 5) from the wind turbine controller (WTC) 250 shown in FIG. 2. Further, the PC 5240 receives the active power feedback signal Pfb. In response to the input signals P*conv and Pfb the PC 5240 determines and outputs a part of the D axis component Vd of the voltage control signal for the PWM generator 255. This part is the above mentioned (see description of FIG. 5) power controller voltage signal (VdpPC), which is indicative for the derivative of the power error. Another part of Vd is given by the above mentioned power feedforward voltage signal VdpXC which is provided by the power feedforward (FF) block 5220. The PC 5240 also outputs the PC frequency signal $\overline{\omega}$PC, which via the frequency droop gain unit (F Droop) 5320 contributes a part of the Q axis component Vq of the voltage control signal for the PWM generator 255. As can be seen from FIG. 6, this part is added to the output Vqpac of the VC 5200 to give the total Q axis voltage demand Vq to the PWM generator 255. The PC frequency signal $\overline{\omega}$PC output of the PC 5240 is further added to the nominal frequency $\overline{\omega}$Nom of the AC system 160 (corresponding to the frequency of the utility grid 195). The sum of the PC frequency signal $\overline{\omega}$PC and $\overline{\omega}$Nom is fed into the theta integrator unit (Iθ) 5380 which integrates the controller frequency to create the angle reference θ0 for the PWM generator 255. The PWM generator 255 creates a proper PWM pulse pattern for the network (DC-AC) bridge 246. Within the AC system 160 each wind turbine (WT) 120 is attempting to satisfy its own local power reference PrefWT controlling the voltage and the angle of the output voltage of its network bridge 246 with respect to the voltage power signal (e.g. 66 kV) of the bus bar 161 of the AC system 160. According to the embodiment described here the PC 5240 is a proportional integral (PI) controller which may act to (i) increase the frequency of the AC system 160, and hence the angle between the voltage power signal of the bus bar 161 and the output voltage of the network bridge 246 in order to increase the power flow from the WT 120 or (ii) decrease the frequency of the AC system 160, and hence the angle between the voltage power signal of the bus bar 161 and the output voltage of the network bridge 246 in order to reduce the power flow.

Since the wind park respectively the offshore system 110 effectively consists of multiple controlled voltage sources (i.e. each WT acts as one controlled voltage source), when any one WT 120 acts to change its power flow, then the effective angle of the voltage power signal at the bus bar 161 changes and thus the power flow to the WT 120 of the wind park 110 will change and their local power controllers respond to this, again to satisfy their local power reference.

Figure 12:
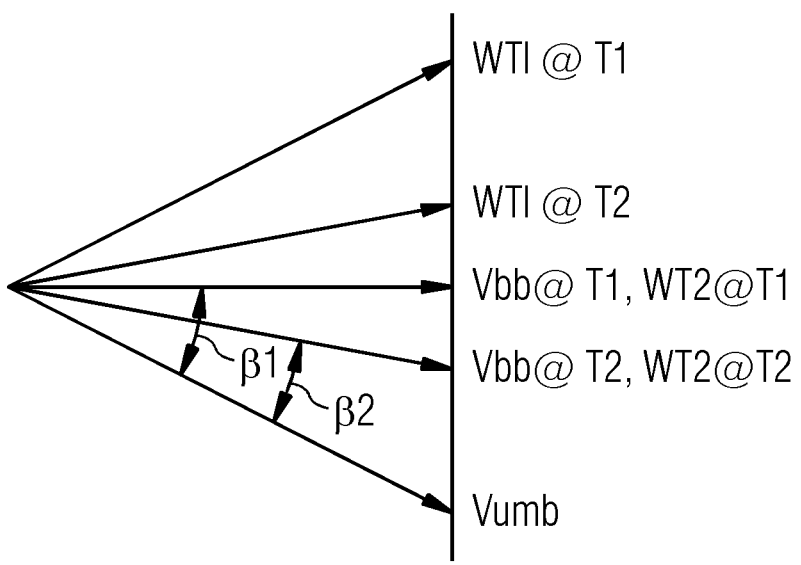
FIG. 12 illustrates a collective behavior of two wind turbines.

In order to understand this collective behavior at this point reference is made to FIG. 12 wherein there is considered a system consisting of two wind turbines WT1 and WT2 both being connected via the same umbilical power transmission system to an AC utility grid. When the WT1 is operated e.g. at 3 MW at a time t=T1, then the bus bar angle (between the voltage Vbb at the bus bar 161) with respect to the voltage power signal Vumb of the umbilical power transmission system 164) is shown with β1. If WT2 is operated at 0 MW at t=T1, then its PWM voltage must be co-incident with Vbb@T1, which is shown as WT2@T1. If now at t=T2, WTG1 reduces its power production to 1.5 MW, then the bus bar voltage power signal Vbb changes phase with respect to Vumb to β2, and thus WT2 must respond to change its voltage vector angle to maintain a zero power low. It is this dynamic control response of the PC 5240 of each individual turbine, which PC 5240 (a) controls the respective power flow towards the offshore AC system 160 and (b) establishes a steady state operating condition of the entire wind park 110 that satisfies the individual power demand of each WT 120. With the configuration 6000 of the controller 5000 the required dynamic response of WT2 to a power change of WT1 can be realized.

In this respect it needs to be considered that each individual WT has its own microprocessor and clock, which is not in any way synchronized with the other WT of the wind park. Thus the power controller 5240 is required to modify the local arbitrary reference frequency (via the PC frequency signal $\overline{\omega}$PC) in order to modify the absolute voltage angle with respect to Vumb respectively with respect to an umbilical transformer primary voltage bus bar (which for the purposes of this description can be considered as an infinite bus bar).

Descriptive speaking, within the configuration 6000 the PC 5240 is used to satisfy a local power reference. Further, the controller 5000 will operate on very weak AC electrical systems. There is no measure of a system frequency, nor does the controller 5000 seek to synchronize its internal dq reference frame with the AC voltage as a current control scheme does. It is the action of the PC 5240 which keeps the output voltage of the network bridge 246 correctly aligned with the voltage signal of the AC system 160. This has the advantage of "simplifying" the controller in that the same PC 5240 is used for an operation in both an AC umbilical mode and a HVDC diode rectifier mode.

TI2: Voltage Control of AC System 160

When in OM1 the wind park 110 is connected to the utility grid 195 via the umbilical power transmission system 164 only, (a) the voltage of the AC system 160 as well as actually (b) the voltage of the bus bar 112 within the wind park 110 is controlled by the action of the VC 5200. The WTC 250 of each WT 120 receives (i) a voltage reference signal from the wind park controller (WPC) 118 or has an appropriate local constant voltage reference and (ii) a signal Va, Vb, Vc representing the local voltage feedback from a local measurement of the voltage at the so called "Low Voltage bus bar" which, as can be seen from FIG. 2, extends between the line reactor 247 and the step-up transformer 248. The VC 5200 then derives a voltage controller (VC) signal Vqpac that forms part of the Q axis voltage control signal Vq being fed to the PWM generator 255. According to the embodiment described here, the VC 5200 performs a PI control based on the two input signals (i) the sum of V* and Vfdroop and (ii) the magnitude |Vfb| of the feedback voltage as shown in FIG. 5 and also in FIG. 6.

Descriptive speaking, in the configuration 6000 the VC 5200 cooperates with the PC 5240 in order to control (i) the voltage of the AC system 160, when the wind park 110 is connected to the utility grid 195 via the umbilical power transmission system 164 only, as well as (ii) the power flow generated by the entirety of the WT's 120. Due to this cooperation of the VC 5200 with the PC 5240 a simple structure of the controller 5000 is sufficient for operating the power generating and forwarding system 100 when operating in OM1.

TI3: Control of Total Power Flow Via Umbilical Power Transmission System 164

In the OM1 when the wind park 110 is connected to the utility grid 195 via the umbilical power transmission system 164 only, the power flow via the umbilical power transmission system 164 is controlled, or limited to a maximum value, by setting the sum of the power limits, which are broadcasted by the WPC 118 to the individual WT 120 respectively to the WTC 250 of the individual WT 120, equal to the desired overall WT power flow in order to achieve a desired power flow via the umbilical power transmission system 164.

In practice it may be desirable for all connected respectively connected WT 120 to supply also the system losses. In order to achieve this, the WPC 118 may measure the power flow via the umbilical power transmission system 164 and then broadcast an appropriate power limit to the connected WT 120 in order to regulate the umbilical power flow to the desired value. In this way, system losses can be taken into account. Thereby, each individual WT 120 controls its power flow to the minimum of (i) the available power from the wind and (ii) the respective power limit received from the WPC 118.

Figure 7:
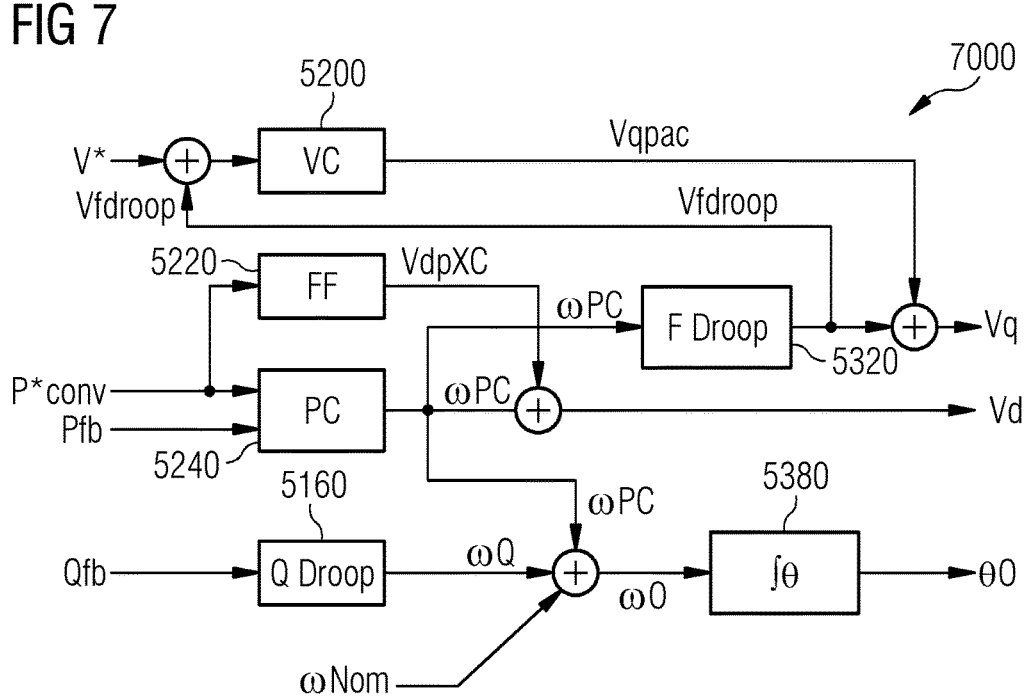
FIG. 7 shows in accordance with a further embodiment of the invention a second configuration of the network bridge controller with the activated components being employed in a first operational mode of the power generating and forwarding system.

FIG. 7 shows in accordance with a further embodiment of the invention a second configuration 7000 of the network bridge controller 5000, wherein there are again illustrated only those activated components respectively blocks of the network bridge controller 5000 which are used in the first operational mode OM1 in order to solve the above specified TI8.

As has already been defined above, in the first operational mode OM1 the wind park 110 is connected to the AC power grid 195 only via the umbilical power transmission system 164.

The activated components/blocks of the second configuration 7000, required to resolve TI8, include the voltage controller (VC) 5200, the power feedforward (FF) unit 5220, the power controller (PC) 5240, frequency droop gain unit (F Droop), and the theta integrator unit (Iθ) 5380. Further, according to the embodiment described here, also the reactive power droop gain unit (Q Droop) 5160 is active.

In the following it will be elucidated how the above mentioned technical issues TI8 can be handled in a beneficial manner with the network bridge controller configuration 7000. Thereby, this TI8 is related to the first operational mode OM1 of the power generating and forwarding system 100.

TI8: Sharing Reactive Power Among the Wind Turbines 120

Whilst the wind park 110 is connected to the AC utility grid 195 via the umbilical power transmission system 164 only (OM1), the reactive power required to satisfy the voltage demand being broadcast from the wind park controller (WPC) 118 to the various WT 120 can be shared by the collective action of the Q Droop 5160 and of the PC 5240. This "reactive power sharing" has a similar functionality as defined in the section above related to the TI7. However in this case there is no frequency controller (FC). In a similar manner to the above given section being related to TI7 the VC 5200 receives the frequency droop voltage signal Vfdroop provided by the F Droop 5320, which is added to its usual input V*. As a consequence, the VC 5200 does not respond to changes in Vq demand caused by the action of the PC 5240. Again, the "reactive power sharing" is achieved by the interaction of the Q Droop 5160, the Power Controller 5240 and the F Droop 5320.

Via the Q Droop 5160 term a frequency $\overline{\omega}Q$ is added which is proportional to the reactive power feedback Qfb. This, together with the also added control signal $\overline{\omega}$Nom which is the nominal frequency of the AC system 160 forces the PC 5240 to reduce its output $\overline{\omega}$PC, and via the F Droop term 5320 this will reduce the Q axis voltage control signal Vq. Hence, the output voltage from this particular WT 120, with respect to the voltage of the offshore AC system 160 and hence voltage of the adjacent WT's 120 will be reduced.

The output of the F Droop term 5320 is added to the reference voltage signal V* provided to the voltage controller 5200 in order to prevent the voltage controller 5200 from compensating for the change in voltage needed to achieve reactive power sharing between the WT's 120. In this respect it is mentioned that in a steady state and with no measurement tolerances a perfect sharing of reactive power would be achieved.

Descriptive speaking, according to the embodiment described here the combination of the components respectively blocks Q Droop 5160, VC 5200, and PC 5240 ensures that the total reactive power load is shared among the connected WT 120.

It is mentioned that compared to the first controller configuration 6000 shown in FIG. 6 here the QDroop block 5160 has been added. This means that the controller configuration 7000 is in effect a superset of the controller configuration 6000. It is in fact the controller block QDroop 5160 which acts to ensure that reactive power is shared between all connected wind turbines such that the above specified TI8 is solved.

Figure 8:
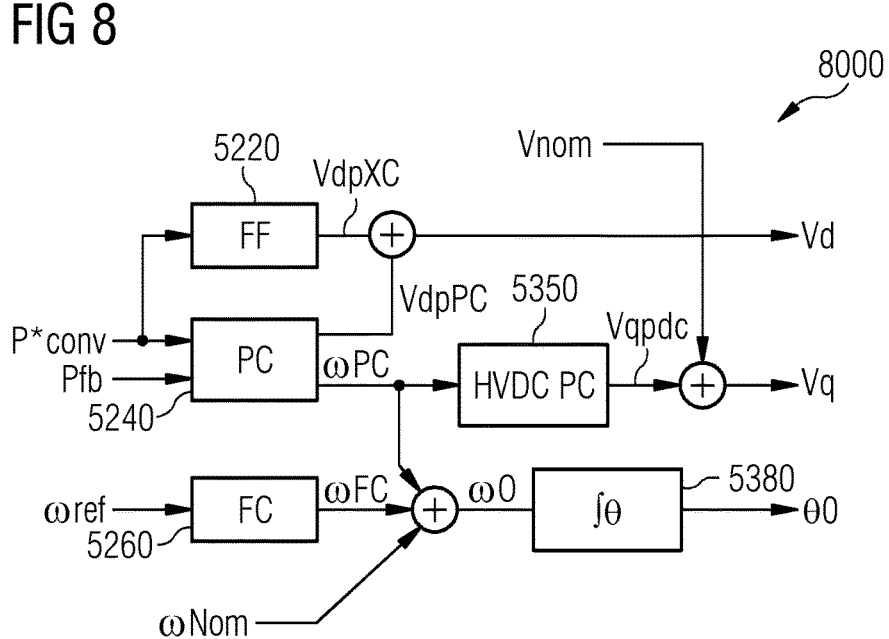
FIG. 8 shows a third configuration of the network bridge controller with the activated components being employed in a second operational mode of the power generating and forwarding system.

FIG. 8 shows a third configuration 8000 of the network bridge controller 5000, wherein there are illustrated the activated components respectively blocks of the network bridge controller 5000 which in the second operational mode OM2 of the power generating and forwarding system 100 are used respectively are active for solving above specified TI4.

As has already been defined above, in the operational mode OM2 the wind park 110 is connected to the AC power grid 195 only via the HVDC power transmission system 170. This means that there is no power flow via the umbilical power transmission system 164.

The activated components/blocks in the third controller configuration 8000, required to resolve TI4, include the power controller (PC) 5240, the frequency controller (FC) 5260, the power feedforward (FF) unit 5220, the HVDC power controller (HVDC PC) 5350 for the HVDC power transmission system 170, and the theta integrator unit (Iθ) 5380. Compared to the network bridge controller configuration 6000, the VC 5200 is replaced by the FC 5260, the frequency droop gain unit (F Droop) 5320 is replaced by the HVDC PC 5350.

It is pointed out that in addition to the control signals introduced already in FIG. 5, in this third configuration 8000 a control signal Vnom is used which is indicative for the nominal voltage of the AC system. Depending on the location of the whole power generating and forwarding system 100 Vnom may be e.g. 230 V (e.g. in Europe) or 120 V (e.g. North America). Normally, the nominal voltage of the AC system is the voltage of the so called low voltage (LV) bus bar, which is typically 690 V. This low voltage is used e.g. for industrial applications or power plants for supplying larger electric motors for driving pumps, conveyors etc. with a power demand in the range between several 100 kW up to several MW.

In the following it will be elucidated how the above mentioned technical issues TI4 being related to OM2 can be handled in a beneficial manner with the network bridge controller configuration 8000.

TI4: Control of Power Flow Via HVDC Power Transmission System 170

When in OM2 the wind park 110 is connected to the utility grid 195 only via the HVDC power transmission system 170 the power flow through the HVDC power transmission system 170 is controlled only by means of the network bridge controller configuration 8000 shown in FIG. 8. Within each WT 120 the locally derived power reference PrefWT respectively P*conv (dependent on prevailing wind conditions and then clamped by a power limit value broadcast from the WPC 118) and the local power feedback Pfb are inputs to the PC 5240. An output of the PC 5240 is the PC frequency signal $\bar{\omega}$PC, which is added to the output of the FC 5260 and to the nominal frequency $\bar{\omega}$Nom of the AC system 160 in order to give the desired local frequency $\bar{\omega}$0. This desired frequency $\bar{\omega}$0, which is the angular speed respectively the rotational frequency of the rotating dq reference frame with respect to the stationary abc reference frame, is integrated by the theta integrator unit (I$\theta$) 5380 in order to give the angle reference $\theta$0 which is provided to the PWM generator 255. Thus the control action, if the local power feed-back Pfb within a WT is lower than the power reference, is to increase (transiently) the local frequency $\bar{\omega}$0. This control action acts to change the local WT power flow into the bus bar 161. The power feedforward voltage signal VdpXC provided by the power FF unit 5220 and the power controller voltage signal VdpPC output of the PC 5240 sum up to give the D axis control voltage demand Vd to the PWM generator 255. This D axis component Vd defines the angle of the modulated PWM voltage with respect to the voltage at the bus bar 161, and hence controls the power flow. When the HVDC diode rectifier 180 is conducting, its power flow is strictly proportional to the AC voltage at the bus bar 161. Thus, when any single WT 120 changes its power flow (by modifying its network bridge output voltage angle as described above), this does not (significantly) change the power flow via the HVDC diode rectifier 180. This does only change the power flow from this particular WT 120 into the AC system 160.

It is mentioned that the AC voltage at the HVDC diode rectifier 180 is the vector sum of the PWM voltages of all WT 120 of the wind park 110. Therefore, changing the D axis control voltage Vd within any one WT 120 will have a very small influence on the AC voltage at the input of the HVDC Diode rectifier 180. However, it is the collective action of the voltage that strongly influences the power flow via the HVDC diode rectifier 180. Thus, a change of the D axis control voltage Vd within any one WT 120 yields a power change which will be absorbed by the remaining WT 120 of the wind park 110, which modify their individual power flow in a similar manner as described above (see elucidation of TI1) in order to retain their desired operating point.

In order to understand this collective behavior one can consider an example where a number N of WT 120 in a wind park 110 are operating at 100% power in a steady state. Then, a first wind turbine WT1 reduces its power to 0% (e.g. the control action of WT1 quickly reduces the power flow from WT1 into the AC system 160 by modifying the network bridge voltage angle $\theta$0 with respect to the voltage signal at the bus bar 161. This means that transiently a number of N−1 WT must provide 100*N/(N−1) % power. This means that each one of the N−1 WT needs to provide more than 100% power. This will appear as a power error within each WT 120 and the power controllers 5240 in all N−1 WT 120 act in order to reduce the PC frequency signal $\bar{\omega}$PC. This will reduce the frequency of the AC system 160. However, since all WT 120 will change their voltage angles $\theta$d this will not modify the local power flow in the N−1 WT 120. However, since the frequency of the AC system 160 has reduced, then via the HVDC PC 5350 performing a DC power control, each WT 120 will reduce its Q axis control voltage Vq for its network bridge PWM generator 255. This combined action of all WT 120 within the wind park 110 has the effect of effectively reducing the voltage at the bus bar 161. Hence, the power flow into the HVDC diode rectifier 180 will be reduced, in this case to ((N−1)/N)*100% Power. In this way the power balance between the AC system 160 and the HVDC diode rectifier 180 will be restored.

The key point here is that any single WT 120 cannot significantly influence the voltage magnitude of the AC system 160. It is rather the collective action of all WT 120 of the wind park 110 that act to change the voltage of the AC system 160. In this way the power flow via the HVDC diode rectifier 180 can be regulated or controlled.

In this respect it should be noted that the action of the PC 5240 does result in small frequency deviations around the frequency reference $\bar{\omega}$ref in order to regulate the power flow into the HVDC Diode rectifier 180. This frequency deviation is corrected via the action of the FC 5260. This action will be described below in detail.

Descriptive speaking, in the third network bridge controller configuration 8000 the PC 5240 simultaneously acts
(i) to satisfy the local WT power reference P*conv respectively PrefWT by a modification of the local frequency $\bar{\omega}$0 (and hence network bridge voltage angle $\theta$0) and also
(ii) to collectively act with other autonomous WTC 250 in order to modify the magnitude of the voltage of the AC system 160 and hence to control the power flow via the HVDC diode rectifier 180. This gives the power generating and forwarding system 100 which is connected via the HVDC diode rectifier 180 similar properties as a conventional AC system in that too much power production in one part of the system forces the local frequency up and increases the angle with respect to another part of the power system and thus increases the power flow. Here, this characteristic is replicated by linking the voltage magnitude at the AC system 160, whereby this voltage magnitude controls the power flow into the HVDC Diode rectifier 180. The required conditions for the AC power flow are achieved by establishing the correct network bridge voltage angle with respect to the voltage signal at the bus bar 161. The required conditions for balancing the power produced by all the WT 120 of the wind park 110 with the power exported via the HVDC diode rectifier 180 is achieved by establishing the correct AC voltage magnitude of the AC system 160 respectively at the bus bar 161. Thus, there is a relationship between the frequency $\overline{\omega}\text{PC}$ and the voltage magnitude of the AC system 160. Any one WT 120 can modify its output voltage vector with respect to the output voltage vectors of other turbines, via the action of the PC 5240 in order to satisfy its local power flow requirements.

Descriptive speaking, if all WT's 120 are trying to "move" their voltage vectors to increase local power flow, then none of the WT's 120 will actually change its power flow, and $\overline{\omega}\text{PC}$ will continue to rise. As $\overline{\omega}\text{PC}$ continues to rise then this has the effect of increasing the voltage magnitude via the HVDC PC 5350 and hence the power flow via the HVDC diode rectifiers 180 will be increased. If the frequency of the offshore AC system 160 is high then this indicates that the WT's 120 are trying to ship more power into the offshore AC system 160, and that the HVDC power transmission system 170 is not exporting enough power. This is why the voltage magnitude of the offshore AC system 160 increases via the HVDC PC 5350, to increase the power flow via the HVDC diode rectifiers 180 and, as a consequence, restore the "power balance" between what the WT's 120 want to export to the offshore AC system 160 and what the HVDC diode rectifiers 180 are exporting from the offshore AC system 160 to the HVDC cable 175 and then onwards to the onshore AC power grid 195 via the onshore DC-AC converter. However, again it is only the collective action of all the WT's 120 of the wind park 110 that can raise the aggregate voltage of the offshore AC system 160 and that can hence increase the power flow via the HVDC diode rectifier 180.

The advantage of this scheme is that the control objectives are achieved without the need for a centralized controller. Each WT 120 can act autonomously and does not require any knowledge of the power references or the number of other WT 120 which are in operation.

Figure 9:
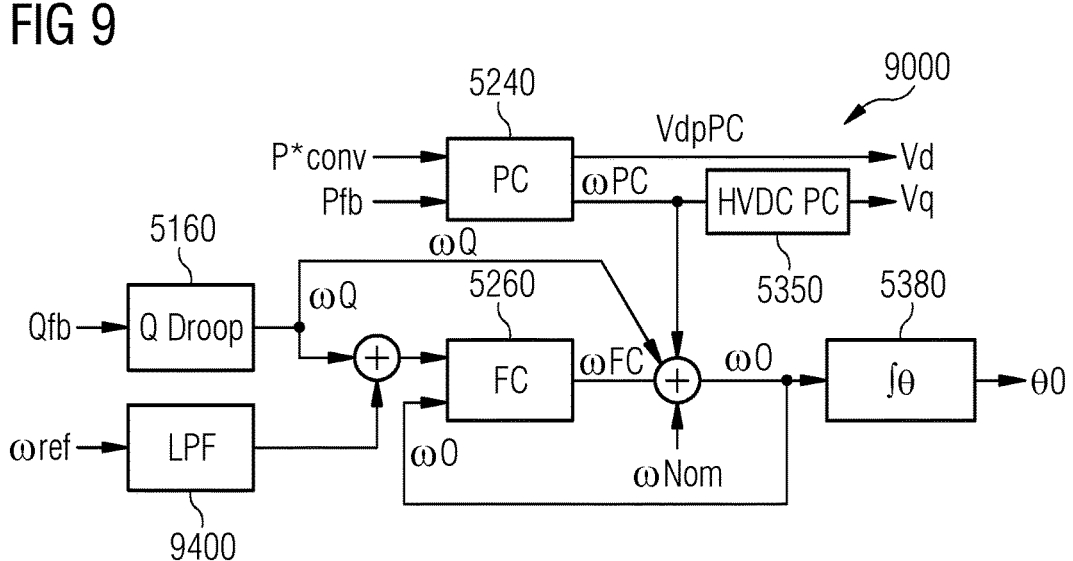
FIG. 9 shows a fourth configuration of the network bridge controller with the activated components being employed in a second operational mode of the power generating and forwarding system.

FIG. 9 shows a fourth configuration 9000 of the network bridge controller 5000, wherein there are again illustrated only the activated components respectively blocks of the network bridge controller 5000 which are used in the second operational mode OM2 for solving both above specified TI6 and above specified TI7.

As has already been defined above, in the operational mode OM2 the wind park 110 is connected to the AC power grid 195 only via the HVDC power transmission system 170 and there is no power flow via the umbilical power transmission system 164.

The activated components/blocks of the fourth configuration 9000, required to resolve TI6 and TI7, include the power controller (PC) 5240, the frequency controller (FC) 5260, the HVDC power controller (HVDC PC) 5350 for the HVDC power transmission system 170, and the theta integrator unit (10) 5380. Further, according to the embodiment described here also the reactive power droop gain unit (Q Droop) 5160 is active. Furthermore, a Low Pass filter (LPF) 9400 is used.

In the following it will be elucidated how the above mentioned technical issues TI6 and TI7 can be handled in a beneficial manner with the network bridge controller configuration 9000. Thereby, the TI6 is related to the operational mode OM2 and OM3.

TI6: Control of Voltage of AC System 160

In OM2 and OM3 the voltage of the AC system 160 is controlled in order to regulate the power flow via the HVDC power transmission system 170. Thereby, each WT 120 is attempting to satisfy its own individual power demand P*conv respectively PrefWT (which is set locally within each WT 120 in order to optimize the energy capture from the prevailing wind at that particular WT 120). Thus, there is again no centralized controller balancing the power flow from the various WT 120 (or the AC system 160) into the HVDC diode rectifier 180. In accordance with the embodiment described here a relationship between the frequency and the voltage of the AC system 160 is created.

If, for example, the frequency of the AC system 160 increases then this indicates that the active power flow into the HVDC diode rectifier 180 from the AC system 160 is less than the WT 120 would collectively like to export. Thus, a greater power flow is required via the HVDC diode rectifier 180, which is why the control action of the controller configuration 8000 is to increase the AC voltage of the AC system 160 via a relationship respectively a link between the PC frequency signal $\overline{\omega}\text{PC}$ and the Q axis voltage control signal Vq created by the HVDC PC 5350.

Conversely, a situation in which the frequency of the AC system 160 is low is indicative for a negative power error (within the PC 5240). In other words, the active power flow into the HVDC diode rectifier 180 from the AC system 160 is greater than the overall power which the plurality of WT 120 would like to export. For each WT 120 the power export is greater than the respective power reference P*conv respectively PrefWT, and thus the power flow via the HVDC diode rectifier 180 needs to be reduced. Hence, the control action within each WT 120 is to reduce the voltage magnitude at the output of the network (DC-AC) bridge 246 via the HVDC PC 5350. It is this coordinated control action by autonomous controllers that is the technical feature that provides the solution in particular to the TI16.

Descriptive speaking, the aggregated AC voltage of the AC system 160 respectively at the bus bar 161 defines the power flow via the HVDC diode rectifier 180. The relationship between the frequency of the AC system 160 and the voltage magnitude Vd (via the HVDC PC 5350) is the mechanism which allows the aggregated voltage of the AC system 160 to be regulated by multiple autonomous controllers 5000 (within each WT 120).

Put in other words, according to the embodiment described here there is a link between the PC 5240 output the PC frequency signal $\overline{\omega}\text{PC}$ and the Q axis voltage control signal Vq via the HVDC PC 5350. Further, compared to an increase of the PC frequency signal $\overline{\omega}\text{PC}$ within one WT 120 or within a few WT 120 only, the AC system 160 will behave in a different manner if all WT 120 of the wind park 110 are simultaneously trying to increase their PC frequency signal $\overline{\omega}\text{PC}$. Then, the local AC power flow from each WT 120 will not change as the angle of the AC voltage of the AC system 160 changes. This leads to an increase or steady state $\overline{\omega}\text{PC}$ term which in turn acts to increase the power flow into the HVDC diode rectifier 180 by increasing the magnitude of the AC voltage of the AC system 160 by means of the HVDC PC 5350.

At this point it is recalled that if in OM3 the umbilical power transmission system 164 is connected, then the frequency reference can be taken from the onshore AC power grid 195. As a consequence, according to the exemplary embodiment described here the frequency controller 5260 shown in FIG. 9 is not active, and the controller configuration is as FIG. 11.

TI7: Sharing Reactive Power Among the Wind Turbines 120

Although the reactive power sharing between wind turbines is actually important for all operational modes, OM1, OM2, OM3, this reactive power sharing is in particular critical for OM2. In OM2, when the AC system 160 is connected via the HVDC power transmission system 170 only, the reactive power required by the AC system 160 must be balanced among all connected WT 120 because the HVDC power transmission system 170 cannot ship reactive power. In this respect it is noted that the required reactive power depends on the operating point of the AC system 160, on the power flow via the AC system 160, and on the voltage of the AC system 160. The reactive power required by the AC system 160 cannot be independently controlled. It is a function
(i) of the reactive power requirements of the HVDC diode rectifier 180, and the series inductive elements in the AC system 160 (e.g. cables, transformers, etc.) and
(ii) of the respectively applied voltage which defines the reactive power produced by the cable capacitances and filters.

However from a rating perspective it is desirable to balance the reactive power provided by each WT 120 equally in order
(i) to achieve approximately equal lifetime from all the network bridge power hardware components of the various WT 120 and
(ii) to prevent any WT 120 to become "saturated" and potentially not contributing to the collective control actions. "Saturated" in this context means that the respective WT 120G is operating at a reactive current limit.

It has to be noted that the reactive power exchanged between the network bridge 246 and the AC system 160 is a function of the difference in the voltage magnitude between the bus bar 161 of the AC system 160 and the network bridge PWM voltage.

In order to achieve this sharing of the total reactive power load, the reactive power droop gain unit 5160 is introduced in the fourth controller configuration 9000. The described reactive power sharing is achieved via a "droop" characteristic. The reactive power feedback Qfb which is fed into the reactive power droop gain unit 5160 and which is derived from the current feedback signals Ia, Ib, Ic and the voltage feedback signals Va, Vb, Vc causes a reduction to the frequency $\bar{\omega}0$ via the $\bar{\omega}Q$ term. The consequence of this is that the power will be modified as the angle of the network bridge PWM voltage will be modified. Then the PC 5240 will respond by modifying its PC frequency signal $\bar{\omega}PC$, and crucially via the HVDC PC 5350, the Q axis voltage component Vq, and hence the reactive power from the respective WT 120. This Q droop characteristic achieves acceptable sharing of the reactive power between all the WT 120 operating on this system. In this respect it is mentioned that in a steady state and with no measurement tolerances a perfect sharing of reactive power would be achieved.

The purpose of adding $\bar{\omega}Q$ to the input of the FC 5260 is to decouple the FC 5260 from this action. Since $\bar{\omega}Q$ is added to both the input and output of the FC 5260 then the FC 5260 will not respond. This means that in the controller configuration 9000 the FC 5260 is effectively inactive for the purposes of the describing the action of the reactive load sharing feature.

It is pointed out that if the reactive power feedback is not the same on two or more WT 120, then the respective frequency reference $\bar{\omega}$ref will also be different on those WT 120. With a non-zero frequency error, the integral term in the FC 5260 will keep on modifying the $\bar{\omega}FC$ term and thus the PC 5240 must modify its PC frequency signal $\bar{\omega}PC$ to maintain a zero power error. When the PC frequency signal $\bar{\omega}PC$ is modified the voltage magnitude on the single WT 120 is modified and thus also the reactive power flow from this WT 120 into at least one of the adjacent WT 120. The control signals can only reach a steady state when the reactive power feedback Qfb is the same on all the connected WT 120 because of the integral action of the FC 5260.

The "reactive power flow sharing" among the connected WT 120, when operating in OM2, is a very important characteristic of the controller configuration 9000. A suitable "reactive power flow sharing" may provide in particular the advantage that the lifetime of the network bridge 246 can be significantly increased.

Descriptive speaking, with the controller configuration 9000 a more uniform voltage of the AC system 160 and thus a proper share of the reactive power load among different WT 120 can be achieved. The change of the frequency of the power output of the network bridge 246 based on a signal $\bar{\omega}Q$ representing the reactive power flow causes a reaction by the PC 5240 than will attempt to satisfy the local power flow at a modified network bridge AC voltage and angle. This modified AC voltage may result in a power imbalance between the power received by the HVDC diode rectifier 180 and the power produced by the connected WT 120. This will cause the connected plurality of WT 120 to respond by collectively changing their voltage output from the respective network bridge 246. In this respect it has to be recalled that the "reactive power sharing" is achieved by minimizing, across the wind park 110, the differences between the voltage magnitude's at the outputs of the respective network bridges 246. This control exploits the fact that any single WT 120 can take a control action locally that will provoke a collective response from all other connected WT 120. This has the effect that the voltage magnitudes of the network bridges tend to converge and minimize the respective differences between difference WT 120. As a consequence, the connected WT 120 of the wind park 110 act to share the total reactive power load.

Figure 10:
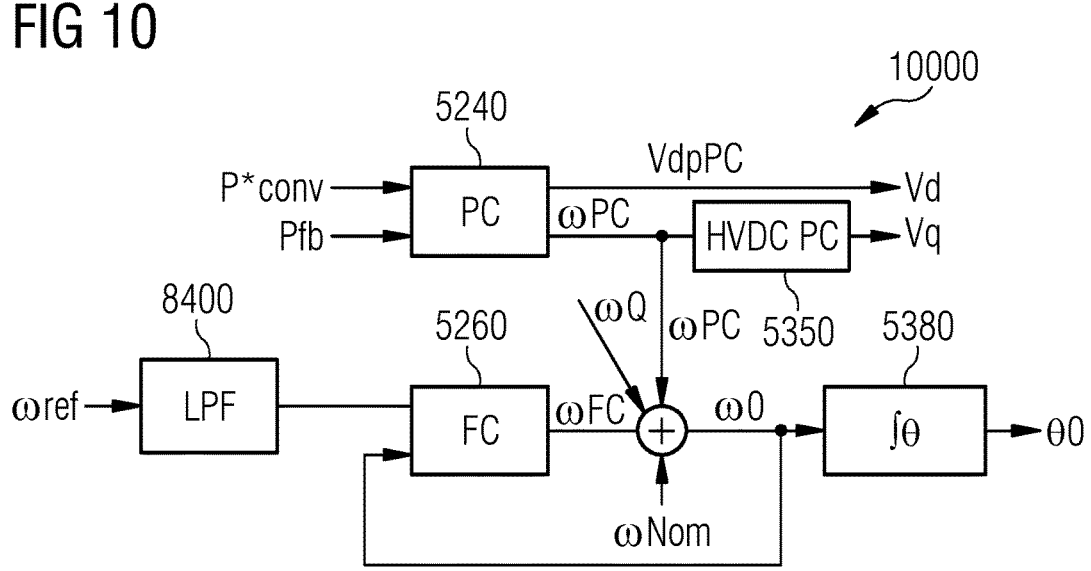
FIG. 10 shows a fifth configuration of the network bridge controller with the activated components being employed in a second operational mode of the power generating and forwarding system.

FIG. 10 shows a fifth configuration 10000 of the network bridge controller 5000, wherein there are again illustrated only those activated components respectively blocks of the network bridge controller 5000 which are used for the second operational mode OM2 in order to solve above specified TI9.

As has already been defined above, in the second operational mode OM2 the wind park 110 is connected to the AC power grid 195 only via the HVDC power transmission system 170.

The activated components/blocks of the fifth configuration 10000, required to resolve TI9, include the power controller (PC) 5240, the frequency controller (FC) 5260, the HVDC power controller (HVDC PC) 5350, and the theta integrator unit (Iθ) 5380 and the low pass filter (LPF) 8400.

In the following it will be elucidated how the above mentioned technical issues TI9 can be handled in a beneficial manner with the network bridge controller configuration 10000. Thereby, this TI9 is related to the second operational mode OM2 of the power generating and forwarding system 100.

TI9: Frequency Control of the AC System 160

Since in OM2 the umbilical power transmission system 164 is deactivated, there is no possibility to use the frequency of the AC utility grid 195 as a reference frequency for the AC system 160.

According to the embodiment described here the presence of the FC 5260 is the main reason for enabling a reliable control of the frequency of the AC system 160. However, as can be seen from FIG. 10, in order to control the power flow, the reactive power balance, and the voltage of the AC system 160, there are various other controllers which make a contribution to the control signal $\bar{\omega}0$. These controllers all provide small components which are added to the nominal or desired frequency $\bar{\omega}$Nom of the AC system 160. It is the task of the "slow" acting respectively "low bandwidth" (as compared to the PC 5240 controller) FC 5260 to return the steady state frequency to the desired frequency $\bar{\omega}$ref while having only a minimal influence on the other controllers (hence why this is a "slow" acting controller).

According to the embodiment described here the FC 5260 consists of a PI controller which has a first input of $\bar{\omega}$ref (broadcast from the WPC 118 via the respective WTC 250 to all the WT 120 and filtered by the LPF 8400). Alternatively, a local constant value can be fed into the FC 5260. A second input for the FC 5260 is the actual frequency $\bar{\omega}0$, which is the angular speed respectively the rotational frequency of the rotating dq reference frame with respect to the stationary abc reference frame. Since the signal $\bar{\omega}0$ depends on the output $\bar{\omega}$FC of the FC 5260, the signal $\bar{\omega}0$ can be considered as to be a feedback signal of and for the FC 5260. As can be seen from FIG. 10, this frequency $\bar{\omega}$FC is summed together with the frequency signals (i) $\bar{\omega}$Nom, (ii) $\bar{\omega}$Q and (iii) $\bar{\omega}$PC provided by the PC 5240 in order to create $\bar{\omega}0$. In this case this frequency $\bar{\omega}0$ is the local "total" frequency reference to the theta integrator unit (1θ) 5380. The purpose of the FC 5260 is to modify the frequency controller frequency signal $\bar{\omega}$FC in such a way that $\bar{\omega}0$ is equal to the desired frequency $\bar{\omega}$ref. The frequency signal $\bar{\omega}0$ is used by the theta integrator unit (Iθ) 5380 in order to generate the angle reference with respect to the PWM generator 255.

The FC 5260 has a simultaneous action within all connected WT 120 of the wind park 110 (as the frequency of the AC system 160 is common to all WT 120) and therefore will not act to change the steady state AC power flow between each individual WT 120 and the AC bus bar 161 of the AC system 160. This means that the PC 5240 will not act to modify its PC frequency signal $\bar{\omega}$PC and thus the voltage magnitude at the bus bar 262 will remain constant to retain the required power flow via the HVDC diode rectifier 180.

At this point it is mentioned that in reality there will be a secondary effect where small deviations in frequency act to influence the voltage drop across inductive components such as transformers, cable series impedance and line reactors within the wind park 110. This will have an influence on the power flow, so the PC 5240 will have to make secondary order corrections for this case.

The described controller configuration 10000 allows in an advantageous manner for an optimization of the design of the AC electrical components within the AC system 160 and the wind park 110 by minimizing a steady state frequency deviation. The FC 5260 of the connected WT 120 act in combination with the respective PC 5240 and the HVDC PC 5350 in order to ensure that the frequency reference $\bar{\omega}$ref is achieved. Again, also the controller configuration 10000 exhibits the characteristic according to which the controller 5000 can act autonomously but in a synchronous manner across all connected WT 120, in combination with a local PC 5240, in order to regulate the frequency of the AC system 160. This gives a steady state "decoupling" between the wind park power balance and the local WT power balance.

Figure 11:
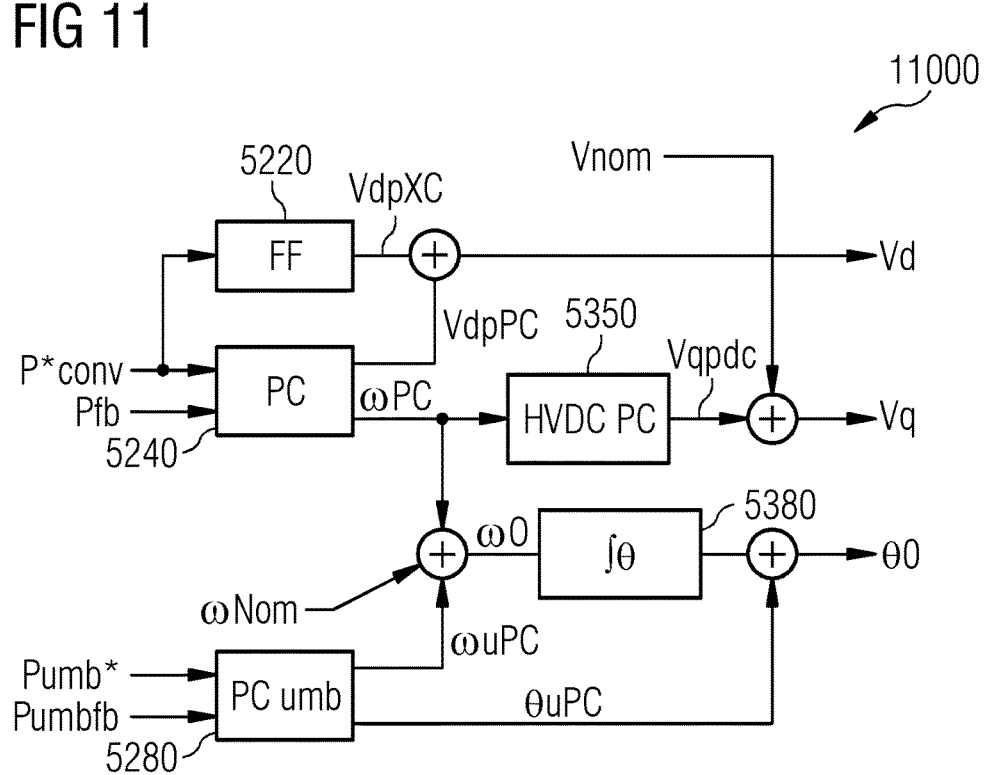
FIG. 11 shows a sixth configuration of the network bridge controller with the activated components being employed in a third operational mode of the power generating and forwarding system.

FIG. 11 shows a sixth configuration 11000 of the network bridge controller 5000, wherein there are illustrated the activated components respectively blocks of the network bridge controller 5000 which in the third operational mode OM3 of the power generating and forwarding system 100 are used to solve above specified TI5.

In the operational mode OM3 the wind park 110 is connected to the AC power grid 195 via both the HVDC power transmission system 170 and umbilical power transmission system 164.

The activated components/blocks in the sixth configuration 11000, required to resolve TI5, include the power controller (PC) 5240, the power feedforward (FF) unit 5220, the HVDC power controller (HVDC PC) 5350 for the HVDC power transmission system 170, the theta integrator unit (Iθ) 5380, and the power controller (PC umb) 5280 for the umbilical power transmission system 164. Compared to the third network bridge controller configuration 8000 described above, the FC 5260 is replaced by the PC umb 5280 and apart from receiving accordingly different input signals an additional control line extends between the output of the PC umb 5280 and an additional summation unit providing the network bridge voltage angle θ0.

TI5: Control of Total Power Flow Via Umbilical Power Transmission System 164

In this respect it is mentioned that in OM3 the total power flow via the umbilical power transmission system 164 should ideally be controlled to zero when the power produced by the wind park 110 exceeds a first threshold (threshold1) and is sufficient to operate the HVDC diode rectifiers 180. When the power produced by the wind park 110 exceeds a second threshold (threshold2) then the umbilical AC cable 165 is disconnected, and the system is operated in OM2. Descriptive speaking, in order to avoid a "chattering" between different operational modes, some hysteresis is provided between the thresholds.

When operating with both the HVDC power transmission system 170 and the AC auxiliary power transmission system 164 the power flow via the umbilical AC cable 165 is controlled by the addition of the umbilical power controller (PC umb) 5280. By contrast to the third controller configuration 8000 being used in OM2 for solving TI4 here the FC 5260 is disabled as it is the (onshore) AC power grid 195 that defines the system frequency.

The power flow through the umbilical AC cable 165 is controlled by the voltage angle across the umbilical AC cable 165. The PC umb 5280, which is a relatively "slow" respectively "low bandwidth" controller compared to the PC 5240, receives an umbilical power reference Pumb* and a power feedback signal Pumbfb indicating the actual power flow via the umbilical AC cable 165. According to the embodiment described here the power feedback signal Pumbfb is broadcasted from the WPC 118 to all WT 120 (see FIG. 1). The output of the PC umb 5280, within each autonomous WT 120, will output the same frequency $\bar{\omega}$uPC (offset), and thus the theta integrator unit (Iθ) 5380 will change the network bridge voltage angle θ0 in all WT 120 of the wind park 110 by the same amount. This will thus have the effect of changing the voltage angle at the bus bar 161 with respect to the voltage angle of the utility grid 195 and hence regulate the power flow via the umbilical AC cable 165, but will not alter the power flow from any individual WT 120 into the AC system 160.

Descriptive speaking, the combination of
(i) the PC 5240 acting to satisfy the local power demand P*conv respectively PrefWT of the WT 120 and
(ii) the PC umb 5280
allows in a beneficial and reliable manner to realize an appropriate control of the total power flow via the umbilical power transmission system 164. Thereby, the PC umb 5280 modifies the angle of the voltage of the AC system 160 respectively the bus bar 161 with respect to the AC voltage angle of the utility grid 195 by adding an identical $\overline{\omega}$uPC component to all WT 120 of the wind park 110. As the PC umb 5280 acts to regulate the power flow via the umbilical AC cable 165 the PC 5240 acts to achieve a power balance between the power produced by all WT 120 and the power flowing via the HVDC power transmission system 170. Thereby, the whole power generating and forwarding system 100 can achieve a steady state and satisfy the control objectives of a proper operating point (i.e. the power references of both the WT's 120 and the umbilical power transmission system 164) unless both controllers PC umb 5280 and PC 5240 act simultaneously. It is noted that although the PC umb 5280 and the PC 5240 act independently, the will act simultaneously in order to achieve the mentioned control objectives. This "local" and "collective" action is basically achieved by means of the difference in the relative "response time" respectively the "bandwidth" of the PC 5240 and the PC umb 5280.

In order to summarize the various controller configuration 6000, 7000, 8000, 9000, 1000, 11000 one can state that the network bridge controller 5000 allows to accomplish a control algorithm which allows each WT 120 to act in such a way as to try and balance the power flow between the connected WT 120 of the wind park 110 and the HVDC diode rectifier 180. This is different to a known wind turbine current control algorithm in that according to the embodiment described here the control of the network bridge current Ia, Ib, Ic is a much higher bandwidth algorithm and therefore will tend to resist a bi-directional power flow within the network bridge 246. The algorithm presented here effectively permits this behavior and thus enables the connected WT 120 to share the "provision of a dynamic response" when operating either via the umbilical power transmission system 164 (OM1) or via the HVDC power transmission system 170 (OM2) or both (OM3). Since the umbilical power transmission system 164 is a comparatively weak AC system there is no "strong" voltage source electrically "close" with which to provide this dynamic response, and thus the WT's 120 must act in such a manner. Such a dynamic response is a requirement for a power transmission based on a HVDC diode rectifier scheme because there is no other bi-directional dynamic energy storage available. When the AC system is connected to the utility grid 195 via the umbilical power transmission system 164, the algorithm described here reduces the "dynamic load" requirements on the respective AC connection, by sharing this "dynamic load" within the wind park 110. The described algorithm does permit a dynamic bi-directional energy exchange with the WT 120, and acts to balance the power flow between the offshore windfarm 110 and the HVDC power transmission system 170, and control the power flow via the umbilical AC cable 165.

In this respect it is mentioned that the use of the power feedforward (FF) unit 5220 in the controller configuration 6000, 7000, and 8000 will extend the bandwidth of this dynamic energy exchange, and will not limit the bandwidth to a bandwidth of the generator bridge controller 252 controlling the operation of the generator bridge 252.

It should be noted that the term "comprising" does not exclude other elements or steps and the use of articles "a" or "an" does not exclude a plurality. Also elements described in association with different embodiments may be combined. It should also be noted that reference signs in the claims should not be construed as limiting the scope of the claims.

LIST OF REFERENCE SIGNS 100 power generating and forwarding system
110 wind park
112 bus bar
114 circuit breaker
118 wind park controller (WPC)/High Performance Park Pilot (HPPP) controller
120 wind turbines (WT)
160 offshore AC system
161 bus bar
162 power switch
163 power switch
164 AC auxiliary power transmission system/umbilical power transmission system
165 AC auxiliary power transmission line/umbilical AC cable
166 power measurement device
167 three phase umbilical power transformer
168 power switch
170 HVDC power transmission system
172 diode rectifier power module
174 three phase transformer
175 HVDC power transmission cable
176 (onshore) DC-AC converter
178 transformer
179 power switch
180 three phase rectifier/HVDC diode rectifier
195 AC power grid/utility grid
Udc HVDC voltage
222 wind rotor
224 rotor blade
226 rotor blade adjustment system/pitch adjustment system
228 drive shaft
230 electric generator
232 generator rotor
234 stator
240 power converter
242 generator (AC-DC) bridge
244 DC link
246 network (DC-AC) bridge
247 line reactor
248 wind Turbine (step-up) transformer
249 PWM filter
250 wind turbine controller (WTC)
251 PWM generator
252 generator bridge controller
254 pitch controller (portion)
255 PWM generator
256 network bridge controller
PrefWT power reference signal (from WTC)
Ia, Ib, Ic current feedback signals
Va, Vb, Vc voltage feedback signals
Vd, Vq voltage control signals for PWM generator in rotating dq reference frame
θ0 actual rotating angle of the rotating dq reference frame with respect to the stationary abc reference frame/network bridge voltage angle
θd power angle
Vpwm three phase modulated voltage
482 power diodes
5000/256 network bridge controller
5100 voltage, current and/or power feedback unit
5130 power reference selection block
5160 reactive power droop gain unit (Q Droop)
5200 voltage controller
5220 power feedforward (FF) unit 5240 power controller (PC)
5260 frequency controller (FC)
5280 umbilical power controller (PC umb)
5320 frequency droop gain unit (F Droop)
5350 HVDC power controller (HVDC PC) for HVDC power transmission system 170
5380 theta integrator unit (Iθ)
ω0 angular speed/rotational frequency of rotating dq reference frame
|Vfb| magnitude of feedback voltage
Pfb active power feedback signal
Qfb reactive power feedback signal
Idpfb current feedback signal
Iqpfb current feedback signal
PrefWT power reference signal from wind turbine controller 250
PrefVdcCtrl power reference signal from a DC link voltage controller
P*conv modified power reference signal
ω̄Q frequency modification signal
ω̄ref frequency reference signal
V* reference voltage signal/set point voltage
Vfdroop frequency droop voltage signal
Vqpac voltage controller (VC) signal
Vqpdc HVDC PC signal
VdpXC power feedforward voltage signal
ω̄PC power controller (PC) frequency signal
VdpPC power controller (PC) voltage signal
ω̄FC frequency controller (FC) frequency signal
Pumb* power reference signal for umbilical power transmission system 164
Pumbfb power feedback signal for umbilical power transmission system 164
ω̄PC frequency signal being indicative for actual power offset of umbilical power transmission system 164
θuPC umbilical power angle signal
ω̄Nom nominal/desired frequency of AC system 160
Vnom nominal/desired voltage of AC system 160
6000 first configuration of network bridge controller 5000
7000 second configuration of network bridge controller 5000
8000 third configuration of network bridge controller 5000
9000 fourth configuration of network bridge controller 5000
9400 low pass filter (LPF)
10000 fifth configuration of network bridge controller 5000
11000 sixth configuration of network bridge controller 5000
Vumb voltage power signal at umbilical AC cable 165
Vbb voltage power signal at bus bar
β1 bus bar angle at t=T1
β2 bus bar angle at t=T2

The invention claimed is:

1. A method for controlling the operation of a wind turbine, wherein the wind turbine comprising a mechanical drive train, an electric generator being mechanically connected to the mechanical drive train, and a power converter being electrically connected to the electric generator, the wind turbine forming a part of a wind park which is connectable to a utility grid via a HVDC power transmission system and/or via an AC auxiliary power transmission system, and further wherein the wind park is in a first operational mode in which the wind park is connected to the utility grid solely via the AC auxiliary power transmission system, the method comprising:

receiving, by means of a power controller, an active power reference signal being indicative for an active power which is supposed to be generated by the wind turbine and an active power feedback signal being indicative for an active power which is actually generated by the wind turbine;

determining, by means of the power controller and based on the active power reference signal and on the active power feedback signal, a first voltage control signal and a power controller frequency signal;

determining, by means of a frequency droop gain unit and based on the power controller frequency signal, a second voltage control signal;

determining, by means of a theta integrator unit and based on the power controller frequency signal, an actual angle signal being indicative for an actual angle between a rotating dq reference frame and a stationary abc reference frame; and controlling an operation of a network bridge of the power converter based on the first voltage control signal, the second voltage control signal, and the actual angle signal.

2. The method as set forth in claim 1, further comprising receiving, by means of a voltage controller, a reference voltage signal being indicative for an AC voltage which is supposed to be provided by the network bridge and a magnitude of a feedback voltage being indicative for the AC voltage which is actually provided by the network bridge; and determining, by means of the voltage controller and based on the magnitude and on the reference voltage signal, a voltage controller signal;

wherein the second voltage control signal is further determined based on the voltage controller signal.

3. The method as set forth in claim 2, wherein the reference voltage signal comprises two components, a first component and a second component, wherein the first component is provided by a wind turbine controller and the second component is derived from the power controller frequency signal, and the second component is provided by the frequency droop gain unit.

4. The method as set forth in claim 1, wherein the second voltage control signal is given by the sum of a frequency droop voltage signal provided by the frequency droop gain unit and the voltage controller signal.

5. The method as set forth in claim 1, wherein the actual angle signal further depends on a frequency reference signal being indicative for the nominal frequency of an AC system which collects AC power generated by the wind turbine and by other wind turbines of the wind park.

6. The method as set forth in claim 1, wherein the theta integrator unit receives an input signal which comprises the sum of the power controller frequency signal and the frequency reference signal.

7. The method as set forth in claim 6, wherein the input signal for the theta integrator unit comprises the sum of the power controller frequency signal, the frequency reference signal, and a frequency modification signal, wherein the frequency modification signal is based on an reactive power feedback signal.

8. The method as set forth in claim 1, further comprising receiving, by means of a power feedforward unit, the active power reference signal; and generating, by means of the power feedforward unit, a power feedforward voltage signal);

wherein the first voltage control signal is further determined based on the power feedforward voltage signal).

9. The method as set forth in claim 1, wherein the first voltage control signal is given by the sum of an output signal of the power controller, which output signal is associated with the first voltage control signal, and the power feedforward voltage signal.

10. A network bridge controller for controlling an operation of a network bridge of a power converter of a wind turbine, wherein the network bridge controller is capable of adopting a configuration having in an activated state:
- a power controller,
- a theta integrator unit, and
- a frequency droop gain unit, wherein the network bridge controller is configured for performing an operational control of the wind turbine by carrying out the method as set forth in claim 1.

11. The network bridge controller as set forth in claim 10, further comprising:
- a voltage controller for receiving a reference voltage signal being indicative for an AC voltage which is supposed to be provided by the network bridge and a magnitude of a feedback voltage being indicative for the AC voltage which is actually provided by the network bridge and for determining a voltage controller signal based on the magnitude and on the reference voltage signal;

wherein the second voltage control signal is further determined based on the voltage controller signal.

12. A wind turbine comprising
- a mechanical drive train having a wind rotor with at least two rotor blades;
- an electric generator being mechanically connected to the mechanical drive train);
- a power converter being electrically connected to the electric generator, wherein the power converter comprises:

an AC-DC generator bridge for rectifying an AC power input provided by the electric generator, a direct current link receiving the rectified an AC power input, and a DC-AC network bridge which converts a DC power of the direct current link into an AC power output; and
- a network bridge controller as set forth in claim 10.

13. A power generating and forwarding system comprising:
- a wind park comprising a plurality of wind turbines;
- an AC system for collecting an AC power being generated by the plurality of wind turbines;
- a HVDC power transmission system being connectable to the AC system and/or to a utility grid for transferring DC power from the AC system to the utility grid, wherein the HVDC power transmission system comprises a HVDC diode rectifier, a HVDC power transmission cable, and a DC-AC converter;
- an AC auxiliary power transmission system being connectable to the AC system and/or to the utility grid for transferring AC power between the utility grid and the AC system;

wherein at least some of the wind turbines are a wind turbine as set forth in claim 1.

14. The power generating and forwarding system as set forth in claim 13, wherein the AC power is transferred from the utility grid to the AC system by the AC auxiliary power transmission system.

15. A computer program for controlling the operation of a wind turbine, the computer program, when being executed by a data processor and in particular by a data processor of a wind turbine controller and/or of a network bridge controller, is adapted for controlling and/or for carrying out the method as set forth in claim 1.

* * * * *